(12) United States Patent
Dorsett et al.

(10) Patent No.: US 9,873,318 B2
(45) Date of Patent: Jan. 23, 2018

(54) SYSTEMS, METHODS, AND APPARATUSES FOR STORING ENERGY IN A MINING MACHINE

(71) Applicant: Joy Global Longview Operations LLC, Longview, TX (US)

(72) Inventors: William A. Dorsett, Longview, TX (US); James B. Dillinger, Longview, TX (US); Michael John Lyten, Wavell Heights (AU); Marcus N. Barr, Longview, TX (US); Bradley Maxwell Neilson, Mt Keira (AU); Don F. Owings, Longview, TX (US)

(73) Assignee: Joy Global Longview Operation LLC, Longview, TX (US)

( * ) Notice: Subject to any disclaimer, the term of this patent is extended or adjusted under 35 U.S.C. 154(b) by 48 days.

(21) Appl. No.: 15/167,608

(22) Filed: May 27, 2016

(65) Prior Publication Data

US 2016/0347163 A1    Dec. 1, 2016

Related U.S. Application Data

(60) Provisional application No. 62/167,814, filed on May 28, 2015, provisional application No. 62/167,808, filed on May 28, 2015.

(51) Int. Cl.
  *B60L 11/02* (2006.01)
  *B61C 9/38* (2006.01)
  (Continued)

(52) U.S. Cl.
  CPC .............. *B60K 7/0007* (2013.01); *B60K 6/30* (2013.01); *B60T 1/02* (2013.01); *B60T 1/10* (2013.01);
  (Continued)

(58) Field of Classification Search
  USPC .............. 290/45; 701/19; 105/26.05, 35, 50
  See application file for complete search history.

(56) References Cited

U.S. PATENT DOCUMENTS 3,623,771 A    11/1971  Sosnowicz et al.
3,915,325 A    10/1975  Lark et al.
(Continued)

FOREIGN PATENT DOCUMENTS

CN    102071718    5/2011
CN    102848895    1/2013
(Continued)

OTHER PUBLICATIONS

PCT/US2016/034795 International Search Report and Written Opinion of the International Searching Authority dated Sep. 8, 2016 (12 pages).
(Continued)

*Primary Examiner* — Pedro J Cuevas
(74) *Attorney, Agent, or Firm* — Michael Best & Friedrich LLP

(57) ABSTRACT

Systems, methods, and apparatuses for storing energy in a mining machine. One embodiment provides a haulage vehicle including a bi-directional electrical bus, a power source coupled to the bi-directional electrical bus, a motor coupled to the bi-directional electrical bus and operating a drive mechanism included in the haulage vehicle, a kinetic energy storage system coupled to the bi-directional electrical bus, and a controller configured to communicate with the kinetic energy storage system and the power source. The kinetic energy storage system includes a flywheel and a switched reluctance motor. The controller is configured to operate the kinetic energy storage system as a primary power source for the bi-directional electrical bus and to operate the power source as a secondary power source for the bi-directional electrical bus when the kinetic energy storage (Continued)

system cannot satisfy an energy demand on the bi-directional electrical bus.

20 Claims, 23 Drawing Sheets

(51) Int. Cl.

| | | |
|---|---|---|
| B60K 7/00 | (2006.01) | |
| B60T 1/02 | (2006.01) | |
| E02F 9/20 | (2006.01) | |
| B60K 6/30 | (2007.10) | |
| E21C 33/02 | (2006.01) | |
| H02K 7/02 | (2006.01) | |
| B60T 1/10 | (2006.01) | |
| B60T 13/58 | (2006.01) | |
| F16D 61/00 | (2006.01) | |
| G05D 1/00 | (2006.01) | |
| B61C 3/00 | (2006.01) | |
| E02F 9/22 | (2006.01) | |
| B60K 6/46 | (2007.10) | |
| E02F 3/34 | (2006.01) | |
| E02F 3/43 | (2006.01) | |

(52) U.S. Cl.
CPC .......... *B60T 13/586* (2013.01); *E02F 9/2041* (2013.01); *E02F 9/2075* (2013.01); *E02F 9/2091* (2013.01); *E21C 33/02* (2013.01); *F16D 61/00* (2013.01); *H02K 7/025* (2013.01); *B60K 6/46* (2013.01); *B60T 2270/60* (2013.01); *B60Y 2200/415* (2013.01); *B60Y 2200/92* (2013.01); *E02F 3/3417* (2013.01); *E02F 3/431* (2013.01); *E02F 9/205* (2013.01); *E02F 9/2217* (2013.01); *Y10S 903/96* (2013.01)

(56) References Cited

U.S. PATENT DOCUMENTS

| | | | |
|---|---|---|---|
| 4,320,814 A | | 3/1982 | Middelhoven |
| 4,358,719 A | | 11/1982 | Currier et al. |
| 5,404,661 A | | 4/1995 | Sahm et al. |
| 5,769,503 A | | 6/1998 | Stolarczyk et al. |
| 5,789,896 A | | 8/1998 | Fischer et al. |
| 6,220,377 B1 | | 4/2001 | Lansberry |
| 6,308,639 B1 * | | 10/2001 | Donnelly ............ B60L 11/02 105/133 |
| 6,469,638 B1 | | 10/2002 | Johnson |
| 6,529,812 B1 | | 3/2003 | Koehrsen et al. |
| 6,591,758 B2 | | 7/2003 | Kumar |
| 6,612,245 B2 | | 9/2003 | Kumar et al. |
| 6,612,246 B2 | | 9/2003 | Kumar |
| 6,615,118 B2 | | 9/2003 | Kumar |
| 6,633,800 B1 | | 10/2003 | Ward et al. |
| 6,922,619 B2 | | 7/2005 | Baig et al. |
| 6,922,990 B2 | | 8/2005 | Naruse et al. |
| 6,973,880 B2 | | 12/2005 | Kumar |
| 7,061,131 B2 | | 6/2006 | King et al. |
| 7,078,877 B2 | | 7/2006 | Salasoo et al. |
| 7,124,691 B2 * | | 10/2006 | Donnelly ............ B60L 3/0046 105/26.05 |
| 7,131,614 B2 | | 11/2006 | Kisak et al. |
| 7,137,344 B2 | | 11/2006 | Kumar |
| 7,185,591 B2 | | 3/2007 | Kumar et al. |
| 7,190,133 B2 | | 3/2007 | King et al. |
| 7,227,273 B2 | | 6/2007 | Ahmad et al. |
| 7,231,877 B2 | | 6/2007 | Kumar |
| 7,302,895 B2 | | 12/2007 | Kumar et al. |
| 7,304,445 B2 * | | 12/2007 | Donnelly ............ B60L 7/06 180/65.265 |
| 7,309,929 B2 * | | 12/2007 | Donnelly ............ B60L 7/06 290/4 R |
| 7,325,498 B2 | | 2/2008 | Kumar et al. |
| 7,330,012 B2 | | 2/2008 | Ahmad et al. |
| 7,349,797 B2 | | 3/2008 | Donnelly et al. |
| 7,350,876 B2 | | 4/2008 | Burgess et al. |
| 7,385,372 B2 | | 6/2008 | Ahmad et al. |
| 7,430,967 B2 | | 10/2008 | Kumar |
| 7,448,328 B2 | | 11/2008 | Kumar |
| 7,479,757 B2 | | 1/2009 | Ahmad |
| 7,500,436 B2 | | 3/2009 | Kumar et al. |
| 7,516,244 B2 | | 4/2009 | Kelly et al. |
| 7,532,640 B2 | | 5/2009 | Kelly et al. |
| 7,532,960 B2 | | 5/2009 | Kumar |
| 7,565,867 B2 * | | 7/2009 | Donnelly ............ B60L 9/22 105/26.05 |
| 7,571,683 B2 | | 8/2009 | Kumar |
| 7,596,893 B2 | | 10/2009 | Tozawa et al. |
| 7,609,024 B2 | | 10/2009 | Ahmad et al. |
| 7,656,342 B2 | | 2/2010 | Stolarczyk et al. |
| 7,658,250 B2 | | 2/2010 | Betz et al. |
| 7,659,847 B2 | | 2/2010 | Bausov et al. |
| 7,667,347 B2 | | 2/2010 | Donnelly et al. |
| 7,669,534 B2 | | 3/2010 | Kumar et al. |
| 7,673,713 B2 | | 3/2010 | Betz et al. |
| 7,770,673 B2 | | 8/2010 | Allen et al. |
| 7,779,616 B2 | | 8/2010 | Sheidler et al. |
| 7,795,825 B2 | | 9/2010 | Williams |
| 7,853,388 B2 | | 12/2010 | Wang |
| 7,854,203 B2 | | 12/2010 | Kumar |
| 7,882,789 B2 | | 2/2011 | Kumar et al. |
| 7,893,658 B2 * | | 2/2011 | Bhardwaj ............ B60L 3/0046 320/147 |
| 7,928,597 B2 * | | 4/2011 | Gupta ............ B60L 1/003 307/10.1 |
| 7,944,081 B2 | | 5/2011 | Donnelly et al. |
| 7,949,441 B2 | | 5/2011 | Baig et al. |
| 7,950,481 B2 | | 5/2011 | Betz et al. |
| 7,956,762 B2 | | 6/2011 | Bailey et al. |
| 7,983,820 B2 | | 7/2011 | Kelly et al. |
| 7,996,163 B2 | | 8/2011 | Bailey et al. |
| 8,013,548 B2 | | 9/2011 | King et al. |
| 8,047,317 B2 | | 11/2011 | Mari Curbelo et al. |
| 8,095,285 B2 | | 1/2012 | Shifferer et al. |
| 8,112,191 B2 | | 2/2012 | Kumar et al. |
| 8,136,454 B2 * | | 3/2012 | Barbee ............ B61C 3/02 105/35 |
| 8,140,206 B2 | | 3/2012 | Bailey et al. |
| 8,174,225 B2 | | 5/2012 | Mazumdar et al. |
| 8,180,544 B2 | | 5/2012 | Noffsinger et al. |
| 8,186,154 B2 | | 5/2012 | Nelson et al. |
| 8,220,572 B2 | | 7/2012 | Donnelly |
| 8,253,357 B2 | | 8/2012 | Bailey |
| 8,280,566 B2 * | | 10/2012 | Foy, III ............ B60L 15/00 246/167 R |
| 8,280,569 B2 | | 10/2012 | Kumar et al. |
| 8,285,434 B2 | | 10/2012 | Yanagisawa et al. |
| 8,286,740 B2 | | 10/2012 | Kagoshima et al. |
| 8,292,015 B2 | | 10/2012 | O'Quinn et al. |
| 8,294,285 B2 | | 10/2012 | Hunter |
| 8,326,499 B2 | | 12/2012 | Sopko, Jr. et al. |
| 8,330,291 B2 | | 12/2012 | Kumar |
| 8,342,103 B2 * | | 1/2013 | Barbee ............ B61C 3/02 105/35 |
| 8,348,804 B2 | | 1/2013 | Lane et al. |
| 8,362,786 B2 | | 1/2013 | Yamane et al. |
| 8,371,230 B2 | | 2/2013 | Kumar |
| 8,371,233 B2 * | | 2/2013 | Kumar ............ B61C 15/04 105/73 |
| 8,408,144 B2 | | 4/2013 | Read |
| 8,428,796 B2 | | 4/2013 | Donnelly |
| 8,428,805 B2 | | 4/2013 | Bailey et al. |
| 8,499,909 B2 | | 8/2013 | Mazumdar et al. |
| 8,505,464 B2 | | 8/2013 | Huber et al. |
| 8,511,449 B2 | | 8/2013 | Kumar |
| 8,534,198 B2 * | | 9/2013 | Matthys ............ B61C 17/00 105/26.05 |
| 8,534,199 B2 | | 9/2013 | Kumar et al. |

(56) References Cited

U.S. PATENT DOCUMENTS

| | | | |
|---|---|---|---|
| 8,536,814 B2 | 9/2013 | Mazumdar et al. | |
| 8,550,007 B2 | 10/2013 | Mazumdar et al. | |
| 8,550,008 B2 | 10/2013 | Mazumdar et al. | |
| 8,571,763 B2 | 10/2013 | Saito et al. | |
| 8,577,530 B2 | 11/2013 | Ruth et al. | |
| 8,583,303 B2 | 11/2013 | Bastien | |
| 8,587,260 B2 | 11/2013 | Kumar | |
| 8,606,444 B2 | 12/2013 | Andris | |
| 8,606,448 B2 | 12/2013 | Anders et al. | |
| 8,606,451 B2 | 12/2013 | Abdel-baqi et al. | |
| 8,610,382 B2 | 12/2013 | Goldammer et al. | |
| 8,622,860 B2 | 1/2014 | Versteyhe et al. | |
| 8,626,403 B2 | 1/2014 | Onsager et al. | |
| 8,631,890 B2 | 1/2014 | Noguchi et al. | |
| 8,649,963 B2 | 2/2014 | Young et al. | |
| 8,660,760 B2 | 2/2014 | Pipponen et al. | |
| 8,662,277 B2 | 3/2014 | Schoon | |
| 8,672,069 B2 | 3/2014 | Cherney et al. | |
| 8,684,150 B2 | 4/2014 | Kumar et al. | |
| 8,692,647 B2 | 4/2014 | Bailey et al. | |
| 8,718,889 B2 | 5/2014 | Jensen | |
| 8,768,578 B2 | 7/2014 | Abdel-Baqi et al. | |
| 8,935,019 B2 * | 1/2015 | Swanson | B60W 20/00 701/19 |
| 9,003,977 B2 * | 4/2015 | Billig | B61C 5/00 105/26.05 |
| 9,099,882 B2 * | 8/2015 | Lammers | H02J 7/007 |
| 9,108,646 B2 * | 8/2015 | Swanson | B60W 20/00 |
| 9,162,560 B2 | 10/2015 | Jacobson | |
| 9,415,781 B2 * | 8/2016 | Hardin | B61C 17/04 |
| 9,616,903 B2 * | 4/2017 | Billig | B61C 5/00 |
| 9,669,851 B2 * | 6/2017 | Cooper | B61L 23/044 |
| 2002/0037211 A1 | 3/2002 | Korycan et al. | |
| 2003/0150352 A1 * | 8/2003 | Kumar | B60L 7/12 105/35 |
| 2003/0151387 A1 * | 8/2003 | Kumar | B60L 7/12 320/104 |
| 2003/0233959 A1 * | 12/2003 | Kumar | B60L 7/06 105/26.05 |
| 2004/0133315 A1 * | 7/2004 | Kumar | B61L 27/0027 700/302 |
| 2005/0052080 A1 | 3/2005 | Maslov et al. | |
| 2005/0139399 A1 | 6/2005 | Gopal | |
| 2005/0206331 A1 * | 9/2005 | Donnelly | B60L 7/04 318/52 |
| 2005/0251299 A1 * | 11/2005 | Donnelly | B60L 7/08 701/19 |
| 2005/0279242 A1 * | 12/2005 | Maier | B60L 7/04 105/26.05 |
| 2005/0279243 A1 * | 12/2005 | Bendig | B61C 5/00 105/26.05 |
| 2006/0061213 A1 * | 3/2006 | Michalko | H02J 4/00 307/9.1 |
| 2006/0076171 A1 * | 4/2006 | Donnelly | B60L 7/04 180/65.225 |
| 2008/0121448 A1 | 5/2008 | Betz et al. | |
| 2010/0039054 A1 | 2/2010 | Young et al. | |
| 2010/0114404 A1 | 5/2010 | Donnelly | |
| 2010/0221071 A1 | 9/2010 | Hinshaw et al. | |
| 2010/0289443 A1 | 11/2010 | Mazumdar et al. | |
| 2010/0308936 A1 | 12/2010 | Cushman | |
| 2011/0094808 A1 | 4/2011 | Mazumdar et al. | |
| 2011/0130906 A1 | 6/2011 | Mayer | |
| 2011/0175579 A1 | 7/2011 | Mazumdar | |
| 2011/0224859 A1 | 9/2011 | Pipponen et al. | |
| 2011/0301794 A1 | 12/2011 | Bastien | |
| 2011/0307127 A1 | 12/2011 | Swenson et al. | |
| 2012/0001743 A1 | 1/2012 | Cotton et al. | |
| 2012/0146387 A1 | 6/2012 | Shatters | |
| 2012/0161497 A1 | 6/2012 | He | |
| 2012/0257424 A1 | 10/2012 | Mazumdar et al. | |
| 2012/0273285 A1 | 11/2012 | Jensen et al. | |
| 2012/0298004 A1 | 11/2012 | Osara et al. | |
| 2012/0305025 A1 | 12/2012 | Helbig et al. | |
| 2012/0316717 A1 | 12/2012 | Daum et al. | |
| 2013/0099561 A1 | 4/2013 | Raman | |
| 2013/0206490 A1 | 5/2013 | Kouvo et al. | |
| 2013/0154523 A1 | 6/2013 | Brown et al. | |
| 2013/0220714 A1 | 8/2013 | Rudinec | |
| 2013/0226419 A1 | 8/2013 | Jensen | |
| 2013/0228377 A1 | 9/2013 | Kuittinen et al. | |
| 2013/0231806 A1 | 9/2013 | Bailey et al. | |
| 2013/0248262 A1 | 9/2013 | Kumar et al. | |
| 2013/0307443 A1 | 11/2013 | Hirozawa | |
| 2013/0307489 A1 | 11/2013 | Kusch et al. | |
| 2013/0325269 A1 | 12/2013 | Izumi et al. | |
| 2013/0338885 A1 | 12/2013 | Kirk et al. | |
| 2014/0021779 A1 | 1/2014 | Teichmann | |
| 2014/0032006 A1 | 1/2014 | Tojima et al. | |
| 2014/0046538 A1 | 2/2014 | Siegel et al. | |
| 2014/0084666 A1 | 3/2014 | Niederriter et al. | |
| 2014/0203760 A1 * | 7/2014 | Lammers | H02J 7/007 320/107 |
| 2015/0081147 A1 | 3/2015 | Kawaguchi | |
| 2015/0086315 A1 | 3/2015 | Hirozawa | |
| 2016/0347167 A1 | 12/2016 | Dorsett et al. | |

FOREIGN PATENT DOCUMENTS

| | | |
|---|---|---|
| CN | 103174185 | 6/2013 |
| CN | 104196079 | 12/2014 |
| EP | 1505213 | 2/2005 |
| EP | 1883552 | 2/2008 |
| JP | 2004229394 | 8/2004 |
| JP | 2008062822 | 3/2008 |
| KR | 10-2010-0035265 | 4/2010 |
| WO | WO 2005119894 | 12/2005 |
| WO | WO 2006121761 | 11/2006 |
| WO | WO 2008076694 | 6/2008 |
| WO | WO 2009103119 | 8/2009 |
| WO | WO 2010145021 | 12/2010 |
| WO | 2014120930 | 8/2014 |

OTHER PUBLICATIONS

PCT/US2016/034670 International Search Report and Written Opinion of the International Searching Authority dated Aug. 30, 2016 (10 pages).

Schepmann, "Ultracapacitor Heavy Hybrid Vehicle: Model Predictive Control Using Future Information to Improve Fuel Consumption," theses (2010) 179 pages, Clemson University.

Office Action from the US Patent and Trademark Office for U.S. Appl. No. 15/166,976 dated Jan. 18, 2016 (8 pages).

* cited by examiner

SYSTEMS, METHODS, AND APPARATUSES FOR STORING ENERGY IN A MINING MACHINE

RELATED APPLICATIONS

This application claims priority to U.S. Provisional Application Nos. 62/167,808 and 62/167,814 both filed on May 28, 2015. The entire content of both provisional applications is incorporated by reference herein.

BACKGROUND

Embodiments of the invention provide mining machines including an energy storage device, such as a flywheel. In particular, some embodiments of the invention provide use of a flywheel energy storage system on a rubber tired, articulated front end loading machine with a switched reluctance drive system.

SUMMARY

Mining equipment commonly works in highly cyclical applications, where direction changes and routine start and stop activities are frequent. These cyclical actions may be used to dig, load, move, and dispatch minerals.

For rubber tired loaders or trucks these cycles may occur over a period from approximately 30 seconds up to and exceeding approximately 3 to 4 minutes depending on the application. The variations between cycle periods of different applications may be attributed to the length of the haul (the distance the machine traverses between the point where the machine collects the material and the point where the machine dumps the material).

For example, for a surface front end loader loading trucks in an open cut mine, the length of the haul may be approximately 30 meters. Accordingly, if the front end loader has a machine speed of less than approximately 15 kilometers per hour ("kph"), the front end loader may complete a cycle in less than 30 seconds. However, for an underground loader operating in a block or panel cave, the length of the haul may exceed approximately 300 meters. Thus, if the underground loader has a machine speed of approximately 20 kph, the underground loader may complete a cycle in approximately 4 minutes.

Similarly, haulage equipment, such as shuttle cars, repeatedly complete the task of retrieving material from a mining machine, hauling the material to a crushing or material handling solution, such as a conveyor, and then returning to the mining machine to gather another load.

Large shovels and draglines also operate in a cyclical manner. For example, shovels and draglines dig and dump in a cyclical motion where the direction of machine swing is reversed to return to a start position while accelerating and decelerating a large vehicle mass.

Accordingly, there are opportunities to improve the efficiency of cyclical operation of mining equipment through the use of energy storage. One opportunity includes capturing the kinetic energy in the movement of the machine, storing the energy, and using the stored energy for the next movement phase of the cycle. Another opportunity includes smoothing the peak power load of a power source by storing energy from the power source at times of low load and using the stored energy to assist the power source to drive the peak load. This functionality allows the power source, which may be a diesel engine, a transformer, or a trail cable, to be downsized reducing installation and maintenance costs. An opportunity also exists, through the same efficiency gain, to improve the overall performance of a machine type, for a given energy consumption.

Accordingly, embodiments of the invention use an energy storage device that includes a flywheel or another form of kinetic energy storage system ("KESS"). The KESS may be used with switched reluctance ("SR") technology to store energy in a kinetic form for later use. Thus, embodiments of the invention incorporate one or more KESSs into a high power, mining traction application, which may be used on surface machines and underground machine incorporating SR technology.

In some embodiments, machines incorporating a KESS as described herein may include a diesel engine as the primary power source. In this embodiment, the KESS performs a power averaging and boost function using both braking energy and energy from the diesel engine output shaft. However, it should be understood that the KESS may also be used with other (non-diesel) power sources. As described in more detail below, the KESS may assist the engine during load peaks and may draw from the engine during load dips. Accordingly, with a properly-sized KESS, the KESS may be used to achieve full power averaging, wherein an engine runs continuously at a near constant load (for example, without variation). Using the power averaging provided by the KESS allows the engine to be downsized. Similarly, power averaging may extend engine life and maximize fuel savings by running the engine in a constant output state.

Furthermore, in some embodiments, the diesel engine may be replaced with a different power source, such as a battery. In particular, the full power averaging provided by a traction system with KESS (as developed with a diesel engine) may optimize a battery solution for some machines, such as a load haul dump ("LHD") or a shuttle car. It should be understood that other power sources, such as fuel cells could also be used as an alternative to a diesel engine (for example, due to the power density of liquid fuel storage over batteries).

For example, some embodiments provide a haulage vehicle including a bi-directional electrical bus, a power source, a motor, a kinetic energy storage system, and a controller. The power source is coupled to the bi-directional electrical bus through a first power converter. The motor is coupled to the bi-directional electrical bus through a second power converter. The motor is powered by energy available on the bi-directional electrical bus and operates a drive mechanism included in the haulage vehicle. The kinetic energy storage system is coupled to the bi-directional electrical bus through a third power converter and includes a flywheel and a switched reluctance motor. The controller is configured to communicate with the kinetic energy storage system and the power source. The controller is also configured to operate the kinetic energy storage system as a primary power source for the bi-directional electrical bus and to operate the power source as a secondary power source for the bi-directional electrical bus when the kinetic energy storage system cannot satisfy an energy demand on the bi-directional electrical bus.

Other embodiments provide a method of operating a haulage vehicle. The method includes determining, with a controller configured to communicate with a kinetic energy storage system and a power source included in the haulage vehicle, an energy demand on a bi-directional electrical bus included in the haulage vehicle and determining, with the controller, energy available through the kinetic energy storage system. The method also includes operating, with the controller, the kinetic energy storage system as a primary power source for the bi-directional electrical bus when the energy available through the kinetic energy storage system satisfies the energy demand and operating, with the controller, the power source as a secondary power source for the bi-directional electrical bus when the energy available through the kinetic energy storage system cannot satisfy the energy demand.

Additional embodiments provide a haulage vehicle that includes a bucket moveable in at least one direction, an actuator for moving the bucket in the at least one direction, an operator control including a selection mechanism, and a controller. The controller is configured to receive an input representing selection of the selection mechanism. In response to the input, the controller is configured to determine a current position of the bucket, retrieve a predetermined carry position from a memory, compare the current position of the bucket to the predetermined carry position, and, when the current position of the bucket differs from the predetermined carry position, automatically operate the actuator to move the bucket to the predetermined carry position.

Further embodiments provide a method of automatically operating a haulage vehicle. The method includes receiving, with a controller, an input representing selection of a selection mechanism. The method also includes, in response to receiving the input, determining, with the controller, a current position of a bucket of the haulage vehicle, and retrieving, with the controller, a predetermined carry position from a memory. The method also includes comparing, with the controller, the current position of the bucket to the predetermined carry position, and, when the current position of the bucket differs from the predetermined carry position, automatically controlling, with the controller, an actuator to move the bucket to the predetermined carry position.

Other aspects of the invention will become apparent by consideration of the detailed description, accompanying drawings, and accompanying appendix.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, aspects of the invention may be implemented in software (for example, stored on non-transitory computer-readable medium) executable by one or more processing units, such as a microprocessor, an application specific integrated circuits ("ASICs"), or another electronic device. As such, it should be noted that a plurality of hardware and software based devices, as well as a plurality of different structural components may be utilized to implement the invention. For example, "controllers" described in the specification may include one or more electronic processors or processing units, one or more computer-readable medium modules, one or more input/output interfaces, and various connections (for example, a system bus) connecting the components.

Figure 1:
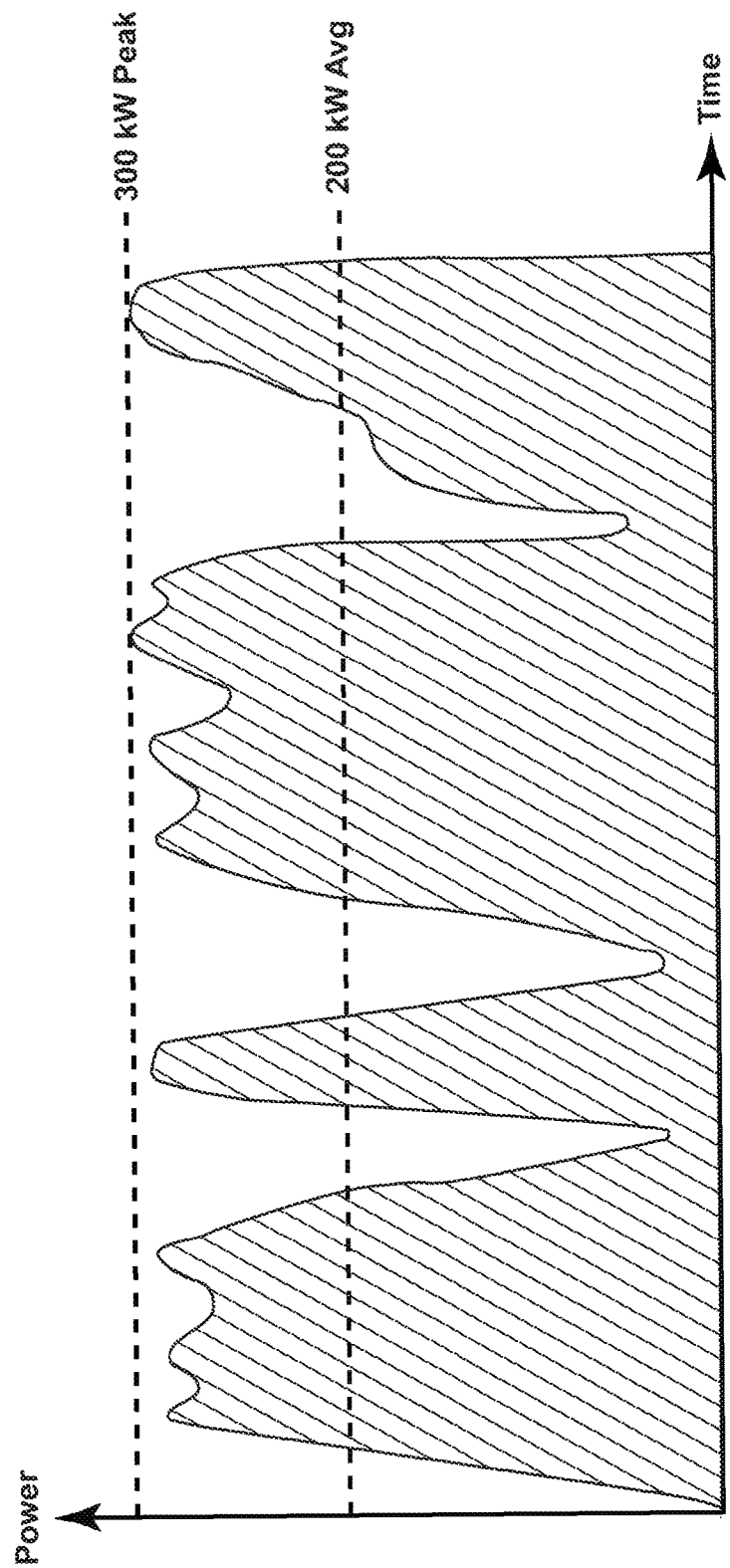
FIG. 1 illustrates a power curve for a mechanical drive system.

As noted above, embodiments of the invention incorporate one or more kinetic energy storage systems ("KESSs") into a machine traction drive train (for example, high power), which may be used on mining machines (for example, surface and underground mining machines) incorporating SR technology. Accordingly, embodiments of the invention may use KESSs with an electric drive system. Electrical drive systems may burn 30% to 40% less fuel than a mechanical drive equivalent. These savings in fuel may be achieved through differences of the respective equipment drive trains and the relative efficiencies. In particular, mechanical drive systems currently used in surface mining applications employ a conventional mechanical drivetrain, with a torque converter, semi-automatic or automatic transmission/transfer case, and differentials. Mechanical drive systems, however, may be inefficient due to operation of the torque converter and may require a large engine for supplying high power output even though the engine may not consistently operate at a peak output level. For example, FIG. 1 illustrates a power curve for a mechanical drive system.

Figure 2:
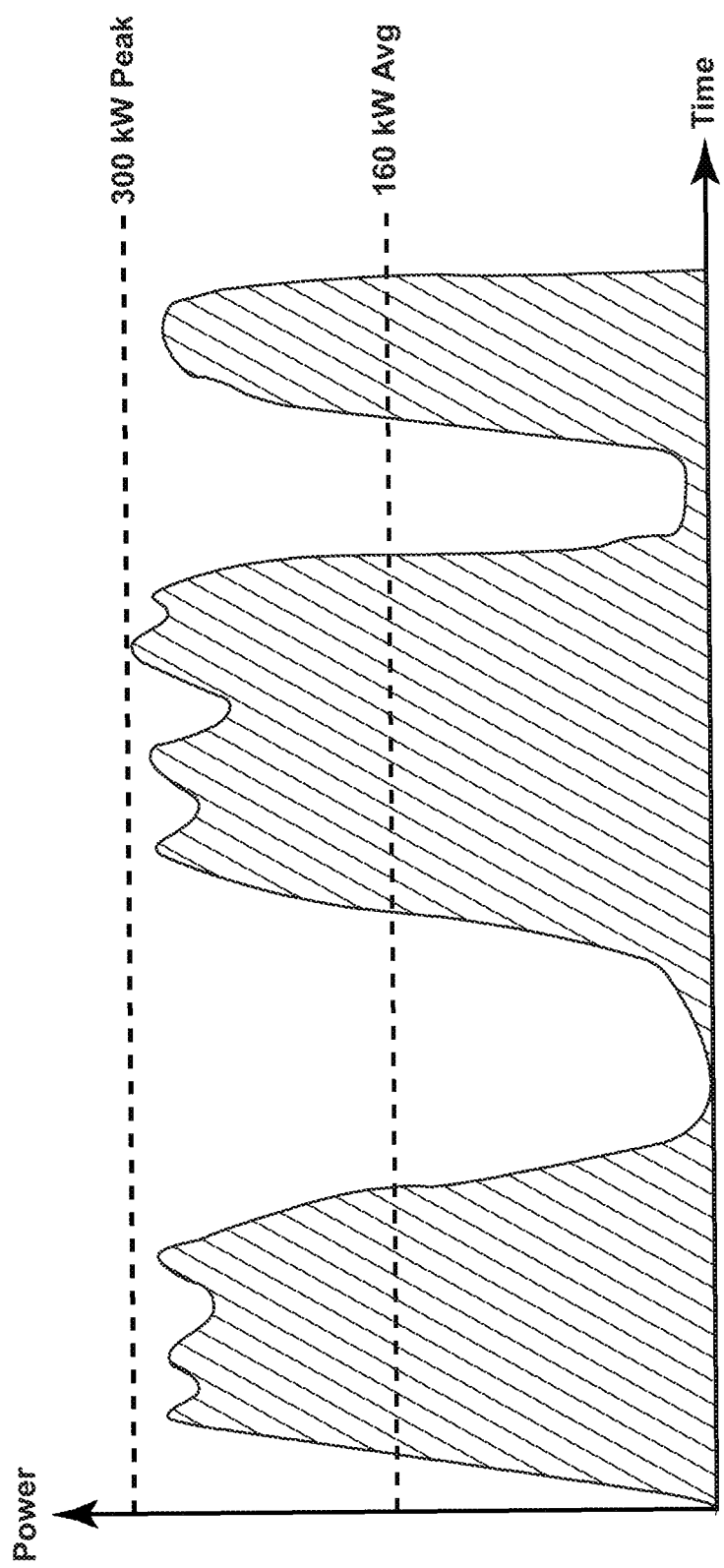
FIG. 2 illustrates a power curve for a switched reluctance ("SR") drive system.
Figure 3:
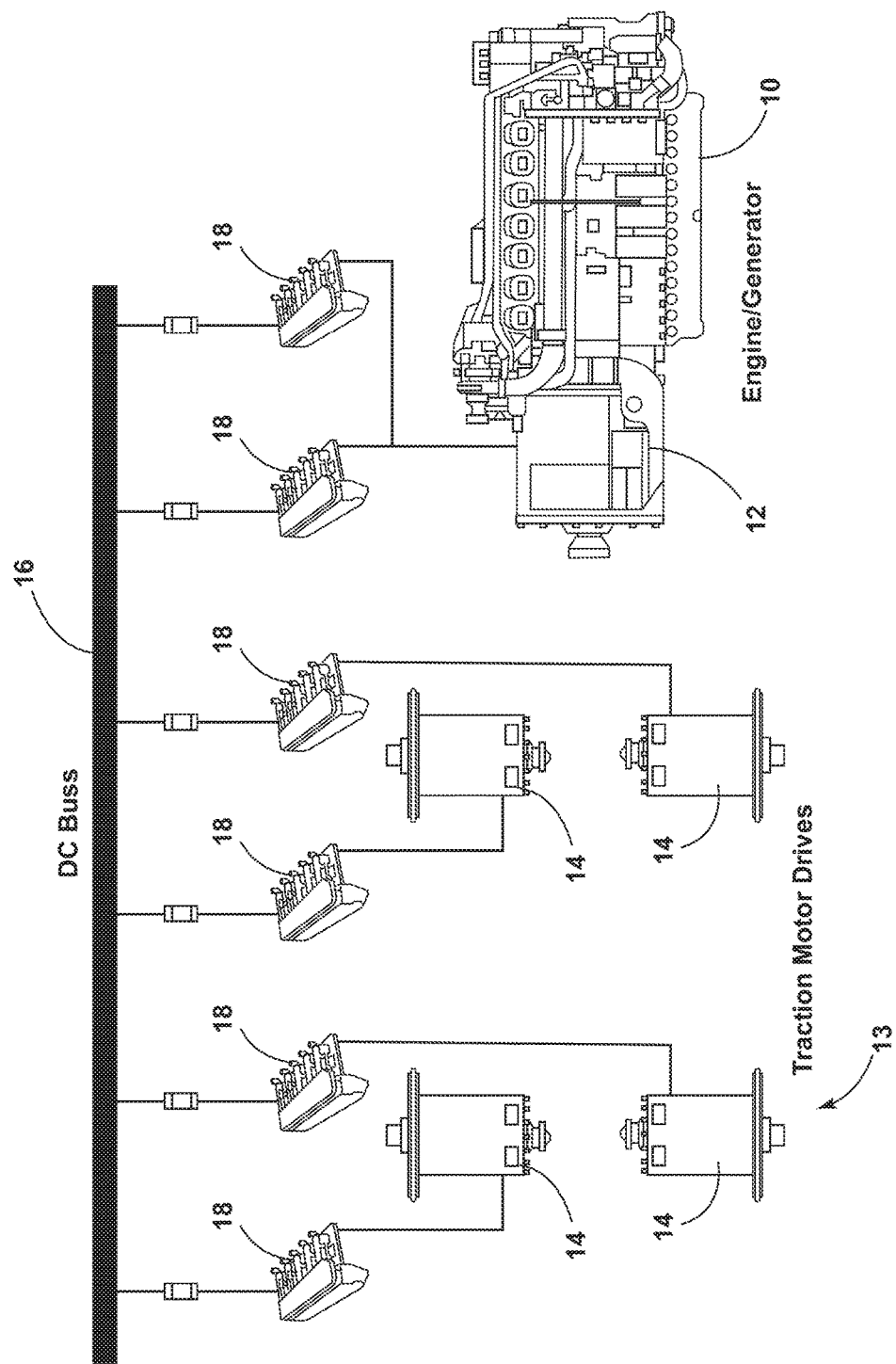
FIG. 3 schematically illustrates system architecture for a diesel-hybrid SR surface loader.

Switched reluctance electric drive systems provide further efficiency advantages over mechanical drive transmission systems. For example, a switched reluctance drive system may allow the engine to be downsized due to the ability of the system to maintain the engine speed at a peak output level. For example, FIG. 2 illustrates a power curve for a switched reluctance drive system. Furthermore, FIG. 3 schematically illustrates a surface loader with a diesel-hybrid SR drive. As described above, surface loaders operate or perform substantially cyclical operations. For example, a surface loader cycle of operation may include approximately four machine direction changes during one cycle that may last approximately 40 seconds.

In particular, as illustrated in FIG. 3, the surface loader includes an engine 10 combined with a motor/generator 12 (for example, an SR motor/generator) and a traction system 13. The traction system 13 illustrated in FIG. 1 includes four SR motors 14. Each SR motor 14 may supply electrical power to one wheel of the loader. The SR motors 14 and the motor/generator 12 are connected by an electrical bus 16 (for example, a direct current ("DC") bus). One or more converters 18 connect the motor/generator 12 to the electrical bus 16. Similarly, one or more converters 18 connect the SR motors 14 to the electrical bus 16. The converters 18 may convert energy supplied by the motor/generator 12 into power supplied over the electrical bus 16. Similarly, the converters 18 may convert energy supplied over the electrical bus 16 into energy usable by the SR motors 14.

In the system illustrated in FIG. 3 the revolutions per minute ("RPM") of the engine 10 is independent of the traction motor speed provided through the SR motors 14. In other words, each SR motor 14 may draw or provide rotational energy to the engine drive line at any speed with little penalty in terms of efficiency loss. In some embodiments, the speed of the engine 10 may be set to run at the lowest RPM at which maximum engine horsepower is available.

The speed setting of the engine 10 (at the peak of the power curve) facilitates the opportunity to increase the speed of the engine 10 above the governor set speed (over speed the engine), which causes the fuel injectors to stop supplying fuel to the engine 10 and allows the drive line to be used as a flywheel to store braking energy. Mechanical drive systems are inefficient in passing energy from the engine driveshaft to the wheels, particularly when there is a high differential in speed (for example, due to torque converter operation in high differential speed conditions). The engine in mechanical drive machines will commonly be under high load at speeds below the peak horsepower curve; meaning that they are burning fuel at less than maximum engine efficiency. Because mechanical drive systems typically require high power at non-optimal engine RPM's, engines may be oversized in relative terms, where the nameplate rating of the engine is similar but a bigger engine volumetric capacity is required. Bigger engines lead to a machine design that has higher operating and rebuild costs in addition to greater frictional losses.

Figure 4:
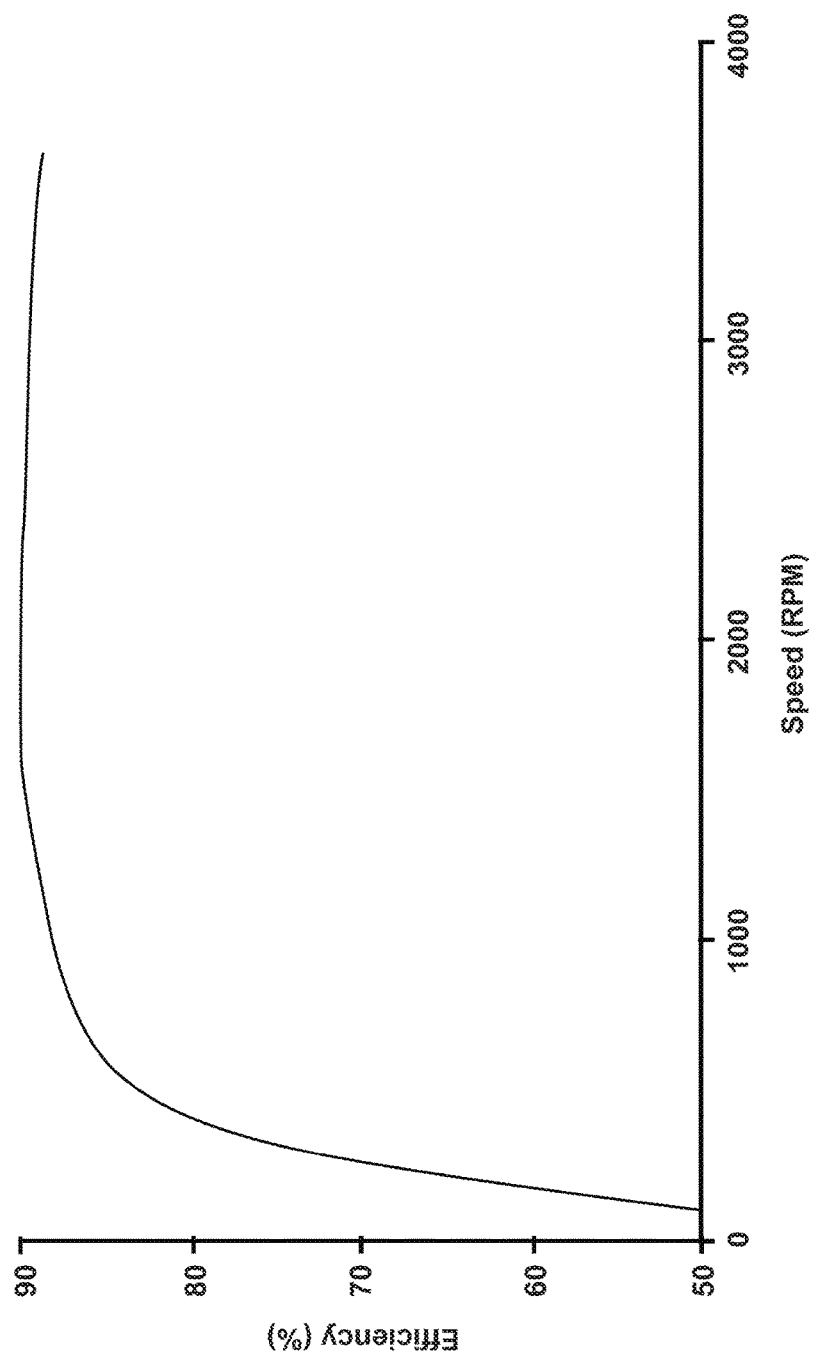
FIG. 4 is a graph of a SR machine efficiency curve.

FIG. 4 illustrates an SR machine efficiency curve. An SR system may provide full torque to the wheels during a stall while consuming only approximately 10% of engine horsepower. This may occur due to the low reactive losses of the SR system. For example, the only significant losses may be the copper losses brought about by the internal resistance of the motor coils and the current passing through them. Accordingly, the SR machine (motor or generator) may have an almost flat efficiency curve across its speed range as illustrated in FIG. 4 above.

A mechanical drive train by comparison is typically at full horsepower output during a stall. The torque converter requires this power to produce torque. Most of this horsepower is lost as heat, which is a byproduct of the torque production process. Furthermore, a torque converter is inefficient whenever significant slip or speed differential is present between the input and output shafts.

Effectively both systems are at zero percent efficiency during a stall because the power output of a stationary shaft is zero. In this condition, transmission efficiency could be measured as a function of output torque against power consumption. However, in this scenario, the SR drive system is more efficient at producing torque per unit of power consumed as compared to the typical mechanical driveline.

Also, on a mechanical drive machine, conventional brakes are used. These brakes are typically multi-pack wet disc brakes. Like all mechanical brakes, these devices convert kinetic energy into heat. The heat on a multi disc brake is transferred to hydraulic oil and is dissipated by way of a radiator cooling system.

In SR drive machines, such as a surface loader, braking energy is diverted back to the engine drive line. In some embodiments, this braking energy is used as described below. In particular, the braking energy may first supply the parasitic losses around the machine. These include but are not limited to the engine fan and other cooling fans, air conditioner and battery charging alternator. These systems are low power in comparison to the braking energy that is being diverted so there is significant energy remaining to be dealt with.

Next, the working hydraulic systems loads may be supplied with energy. This includes the hoist, bucket, and steer hydraulic functions. Any remaining energy may be used to contribute energy to the drive train. For example, the SR generator, now acting as a motor, contributes motive force to the drive train to a point where the engine's governor is able to reduce or cut off fuel supply to the injectors. At this point the engine may not be consuming any fuel and frictional and windage losses of the engine are being compensated for by the SR generator. In these embodiments, the engine speed may be increased up to the engine's mechanical limit, at which point the engine becomes an energy storage device (a flywheel), albeit with poor efficiency due to the engine's friction and windage. The overhead of engine speed (for example, approximately 300 RPM) above the governor cutoff point may be used on the next propulsion phase to boost available power to the traction system above that of the nameplate rating of the engine. Using the driveline as an energy storage device as described above provides an energy storage option when the cycle speed of the machine is fast (for example, less than approximately 50 seconds) and the energy storage capacity is low as the energy stored on the driveline may be reused by the traction system before it is consumed by the engine's friction and windage losses. Accordingly, this energy storage option may be used on surface loaders at high altitude where less overall oxygen is available for engine combustion. For example, at high altitude larger diameter turbo charges are often required to supply air to the engine. These turbo charges take a long time to spin up to a working speed due to the larger inertial mass. This time constraint effects the response time of the engine. Therefore, a KESS may supplement the traction system power needs while turbo charges get up to a working speed.

Figure 5:
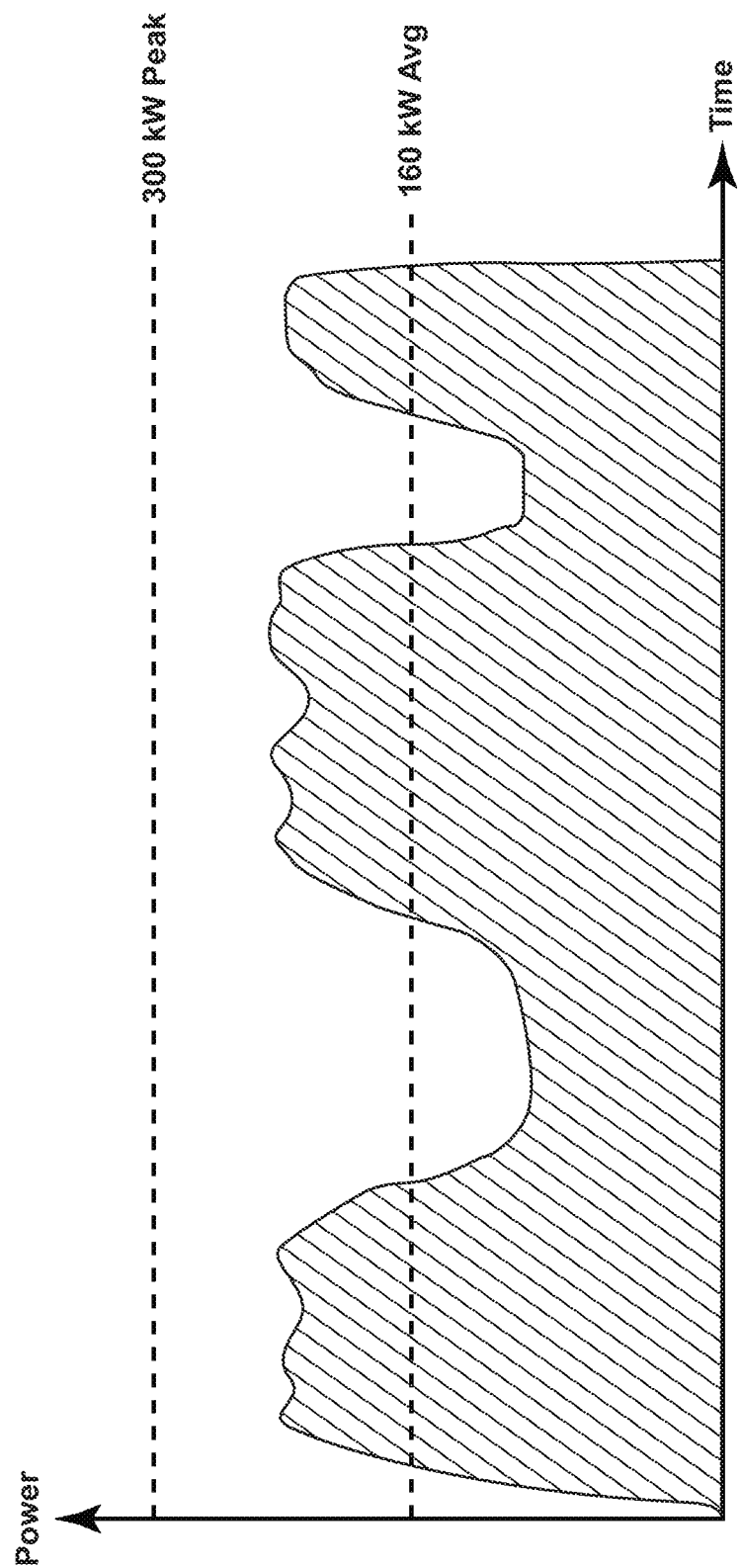
FIGS. 5 and 6 illustrate power curves for an SR drive system with a kinetic energy storage system ("KESS").
Figure 6:
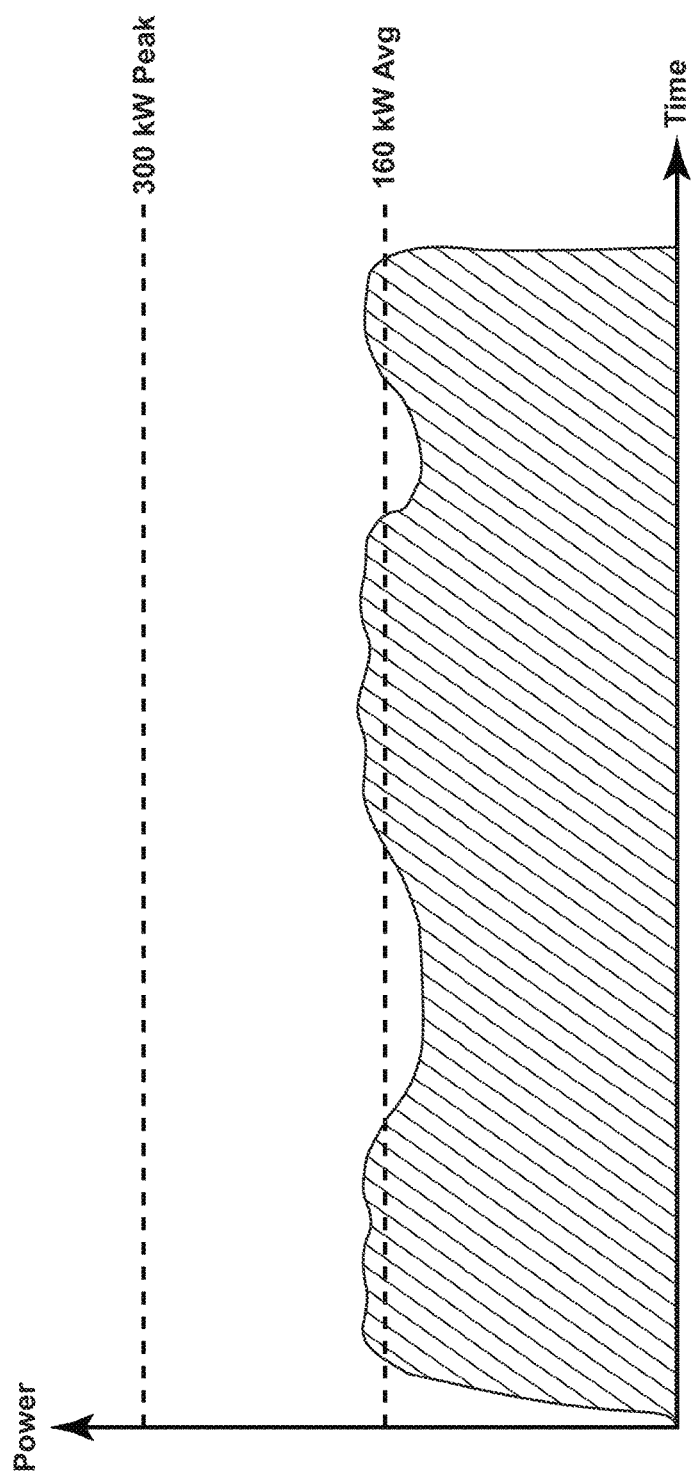
Figure 7:
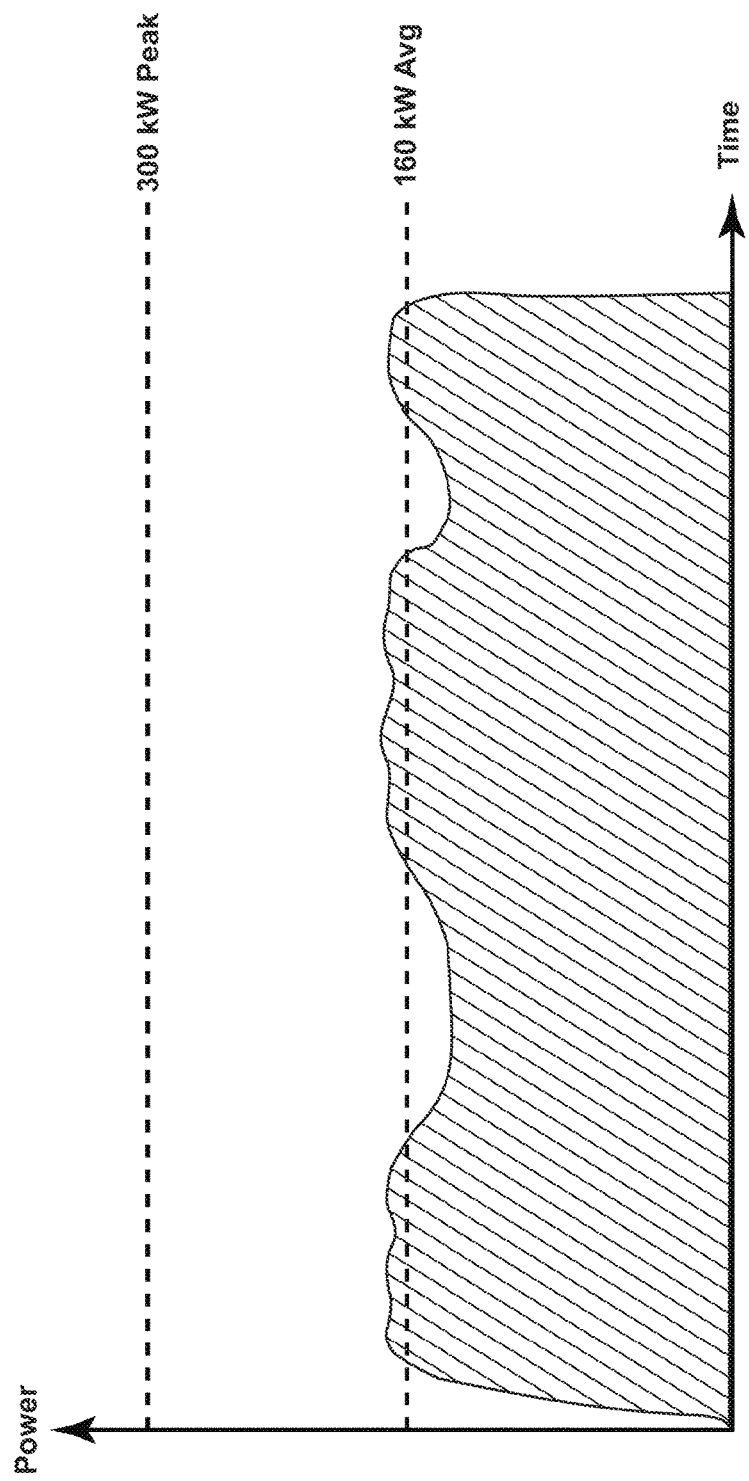
FIG. 7 illustrates a power curve for a SR drive system with a KESS and a battery or fuel cell.

However, for underground mining, as an alternative to or in combination with storing energy on the engine drive line, a KESS may be used to store braking energy. The KESS provides gains in fuel efficiency and, consequently, reduces emissions. In particular, the KESS provides a longer duration, higher capacity, and higher efficiency storage solution than the driveline storage solution used on surface loaders as described in the previous paragraph. For example, FIG. 5 illustrates a power curve for a switched reluctance drive system including a KESS. As illustrated in FIG. 5, the KESS may provide a power boost to supplement output from the engine, may allow the engine to be downsized, or a combination thereof. For example, FIG. 6 illustrates a power curve for a switched reluctance drive system including a KESS larger than the KESS represented in FIG. 5. As illustrated in FIG. 6, the larger KESS may provide maximum power averaging of the engine while providing high peak power to the traction system. Furthermore, FIG. 7 illustrates a power curve for a switched reluctance drive system including a KESS and a battery (for example, a sodium battery), a fuel cell, or both. As illustrated in FIG. 7, with an averaged power source, alternative energy supply technologies may be employed, such as fuel cell technologies and battery technologies.

The operational profiles of an underground mining machine different significantly from operational profiles of a surface mining machine, such as a loader, shovel, and the like. For example, a surface operational profile is commonly short, where the machine encounters four direction changes in a 40 second cycle period and spends approximately 8 to 10 seconds at stall filling the bucket. In contrast, there are two main modes of operation in the underground environment: (1) development and (2) production work. Both modes of operations differ from surface operation in terms of haul distance and resultant cycle time. For example, an underground machine may haul materials over distances up to 200 meters in mine development and over 350 meters in production and these distances result in cycle times that vary from approximately 2 to approximately 3 minutes.

Also, in underground mining environments, the production environment is predominantly flat. For example, the maximum grades seen in this operation are around 1 in 50. As described above, underground machines may haul material over distances exceeding 350 meters. Also, in the production cycle, the machines will typically complete two forward trams and two reverse trams. In addition, in many mines, a production loader may visit many extraction points at varying distances from the crusher to collect ore. Accordingly, the nature of this cycle may be dependent on mine layout and distance of the ore to the crushing plant loading hopper.

Based on this type of environment, one opportunity to store energy in the production cycle is during braking events. To maximize productivity, the underground machine should be able to accelerate and decelerate quickly. Accordingly, during deceleration, energy taken from the traction motors may be captured for later reuse by a KESS. Additionally, when the engine is in a low demand situation, some of its available power could be used to supply energy to KESS. As noted above, using stored energy in this manner allows the diesel engine to be downsized by averaging engine output power over a cycle. In addition to downsizing the engine, which reduces costs, the magnitude of the downsize may also, in some embodiments, result in a smaller block size engine being used, which provides additional performance gains as the friction and windage losses of the engine are further reduced.

The KESS used in these situations may be capable of storing the energy of one or two braking events (for example, approximately 1.2 mega joules ("MJ") per event) with high power capacity (for example, approximately 500 kilowatts ("KW")) to allow the KESS to be filled or emptied in a matter of seconds. The KESS may also be configured to provide efficient uptake and release of energy and retain stored energy with minimal loss over time.

With regard to the development environment, a larger percentage of the development work occurs around the mine entry road or decline. These declines are typically at a slope of approximately 1 in 6.5. When working in the development environment, the underground machine digs out of the bottom of the decline, where the road is being extended, through drill and blast techniques. The machine then trams up the incline haul between approximately 25 to approximately 200 meters where the machine dumps the material or loads the material into a truck. The underground machine then returns to the dig face, which involves driving down the approximately 200 meter slope while braking to manage speed.

The up slope haul is engine power intensive and impacts transmission life while the down slope return typically places a large strain on brakes. A KESS that stores the braking energy generated on the down slope run to the dig face (for example, yielding up to 10 MJ) may provide a significant boost to the engine on the up slope run.

Figure 8:
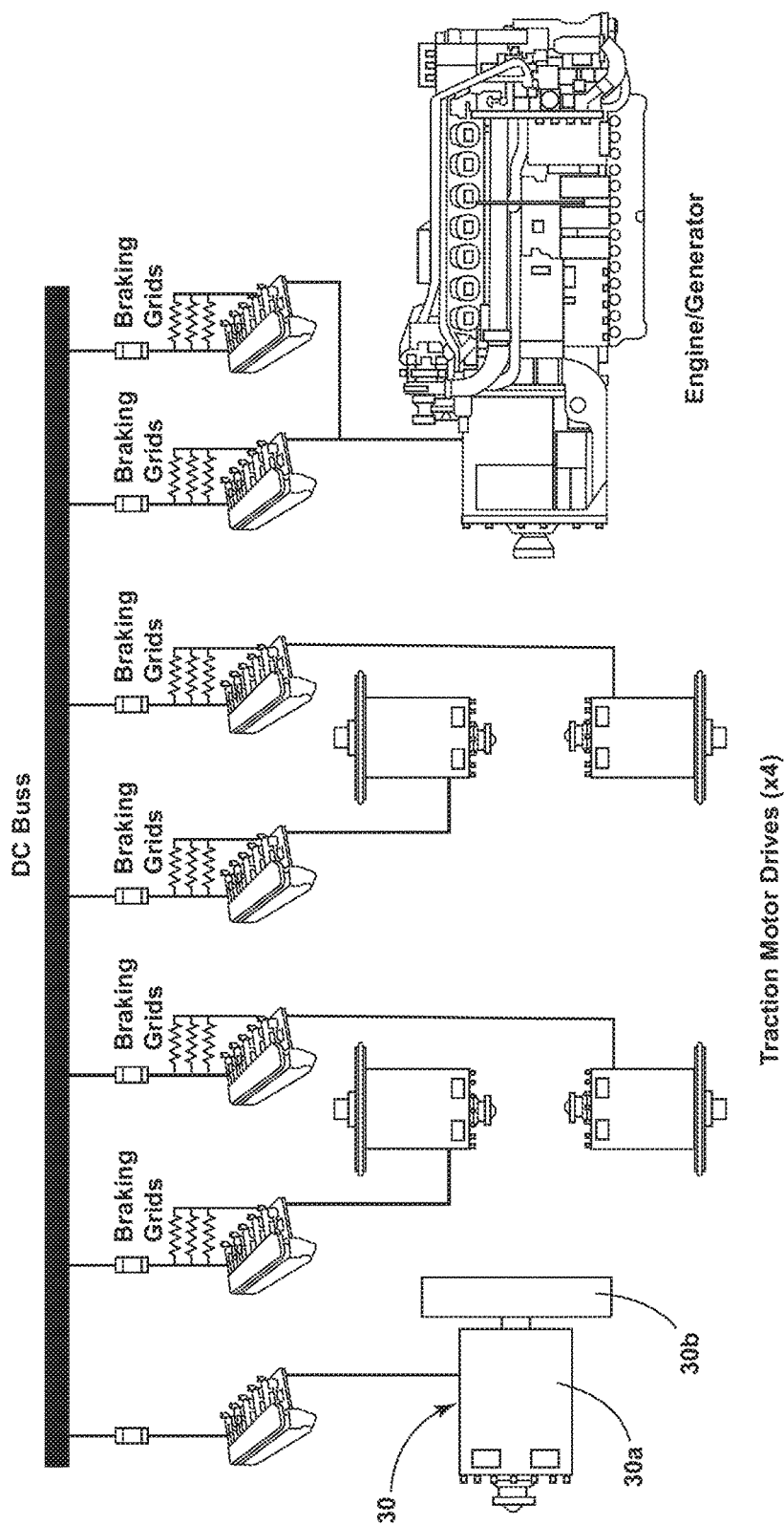
FIG. 8 schematically illustrates system architecture for a SR drive system with a KESS.

FIG. 8 illustrates a SR drive system with a KESS 30. The KESS 30 includes an SR drive motor 30*a* and a flywheel 30*b*. In the configuration illustrated in FIG. 8, the KESS 30 may be configured to store braking energy as the machine slows (the speed of a drive mechanism decreases) as per operator command. The energy may be held in the KESS 30 for several minutes. When the operator commands the machine to accelerate, the KESS 30 releases energy to the traction system, supplementing the energy supplied from an engine (for example, a diesel engine) via a motor/generator. In some embodiments, this release of energy from the KESS 30 allows the machine to have a peak horsepower available of approximately double the output of the engine alone.

There may be periods during the operating cycle when the engine is not operating at full load. During these periods the engine power may be used to "top up" the KESS 30. This functionality may ensure that the KESS 30 is charged or full prior to an acceleration event.

In some embodiments, the speed of the KESS 30 may be loosely tied to machine speed. For example, as the machine speeds up (the speed of a drive mechanism increases), the KESS 30 may slow (the rotational speed of the flywheel 122 may decrease) as a function of the release of energy from the KESS 30. Conversely, as the machine slows (the speed of a drive mechanism decreases), the KESS 30 may be charged and will correspondingly speed up (the rotational speed of the flywheel 122 increases). One advantage of this operation of the KESS 30 is that the gyroscopic forces of the KESS 30 will be lowest when the machine is at high speed and rapid movement or contact with the wall could result in a significant bearing or housing overload. In some embodiments, a target machine speed may be received from an operator control.

Figure 9:
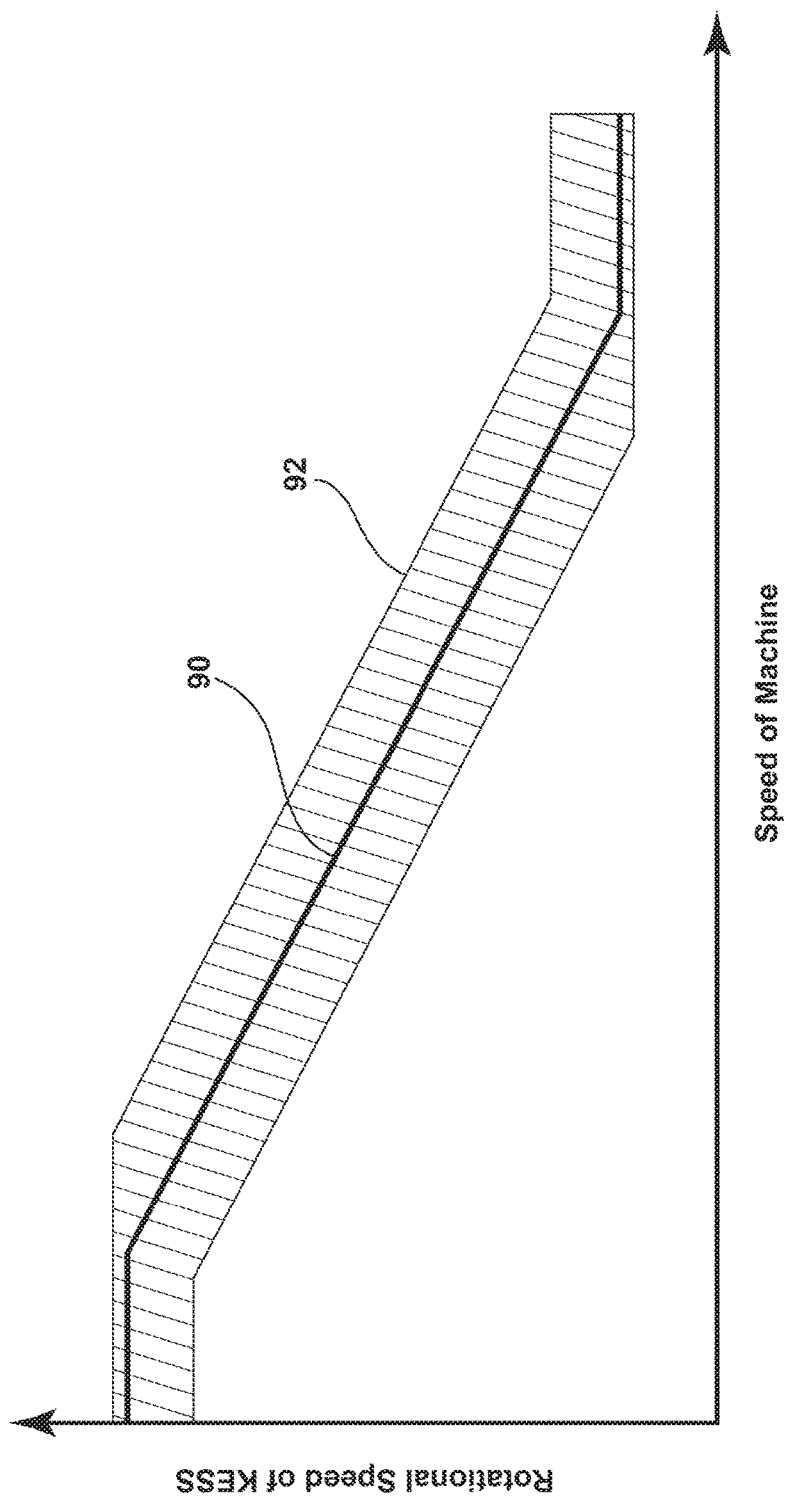
FIG. 9 illustrates a control curve for a KESS.

For example, in some embodiments, the speed of rotation of the KESS 30 (the rotational speed of the flywheel 30*b*), and, therefore, the energy stored within the KESS 30, is controlled as a function of machine speed. For example, FIG. 9 illustrates a control curve comparing a speed of the machine to a rotational speed of the KESS 30. The line 90 indicates a target speed of the KESS 30 for a given machine speed and the area 92 surrounding the line 90 indicates an allowable range of variation around the target speed. The relationship illustrated in FIG. 9 may be employed to provide management of the gyroscopic forces of the KESS 30, which may be very high when high machine angular velocity (rate of direction change) coincides with high speed of rotation of the KESS 30. The shape of the curve also takes into account the energy required to accelerate and decelerate the machine and may be defined for the specific equipment and application.

As described in more detail below, in some embodiments, as the speed of the machine increases (during acceleration) energy is taken from the KESS 30 and provided to traction motors by placing the energy onto a bi-directional bus (for example, a DC bus) powering the traction motors. This supply of energy reduces the speed of the rotation of the KESS 30. When the traction system requires more power than the KESS 30 is providing, a diesel engine may provide supplemental energy. Similarly, when the KESS 30 provides more energy than is required by the traction motors, excess energy may be dissipated across braking grids.

Likewise, as the speed of the machine decrease (during deceleration), the KESS 30 is commanded to increase speed, and the energy required to increase the KESS 30 speed is taken from the bi-directional bus. This energy is supplied by the traction motors operated in a braking mode of operation. In some embodiments, when the KESS 30 does not receive sufficient energy from the traction motors during the braking mode of operation to meet the requirements of the speed curve, energy may be accepted from the diesel engine via a generator. Similarly, when the KESS 30 is receiving an excess of energy, energy may be routed to the engine driveline via the generator to overcome any driveline losses and defuel the engine. Any additional excess energy may be dissipated across the braking grids as heat.

Accordingly, as described above, the KESS 30 may supply or harvest energy from the bi-directional bus as determined by the control curve illustrated in FIG. 9. The engine, through the functionality of the generator, may supply energy only when there is a shortfall between the energy supplied by the KESS 30 and the energy demanded by the traction motors. Variation between supply and demand is a function of the operating conditions in which the machine is situated. For example, the grade or slope and rolling resistance of the roadway upon which the machine is operating may alter the supply and demand balance between the KESS 30 and the traction motors both when the traction motors are operating in a propulsion mode and a braking mode, which alerts the amount of energy demanded or supplied. Accordingly, in rudimentary terms, the KESS 30 may be the primary power source for the bi-directional bus and the engine may be a secondary power source for the bi-directional bus, such as when the KESS 30 cannot satisfy the an energy demand on the bi-directional electrical bus.

Accordingly, in the underground mining space, one benefit of the KESS 30 is that peak engine horsepower of machine operating in that environment may be reduced. This may be an important factor as engine horsepower may be a determining factor in ventilation requirements of an underground mine, which is a significant capital spend for the customer. For example, many jurisdictions use nameplate engine horsepower as the basis for ventilation air flow in compliance standards.

For surface machines, a KESS provides benefits in high altitude situations where engine response is diminished due to thinner air (less overall oxygen is available for engine combustion). For example, to overcome the thin air issue, engine manufacturers typically increase the diameter of the turbo chargers. This increased diameter increases the inertia of the turbo chargers resulting in longer turbo lag (wait time for the turbo charger to build speed and boost). The KESS may be used to provide a supplemental energy source to the machine while engine horsepower output is increasing. For example, the KESS may be used to smoothly load the engine to provide driveline response and hence better operational performance, provide additional power boost from braking energy that would otherwise be dissipated as heat, or a combination thereof.

It should be understood that the size of the KESS (for example, energy capacity and power rating) is based on the requirements of the application. For example, some applications may use a KESS solution as a low capacity and high power solution or other combinations of capacity and power depending on the operational needs of the machine. For example, when a machine is providing maximum power for extended periods, the machine may be equipped with a KESS that provides high energy storage capability and a high power rating.

Figure 10:
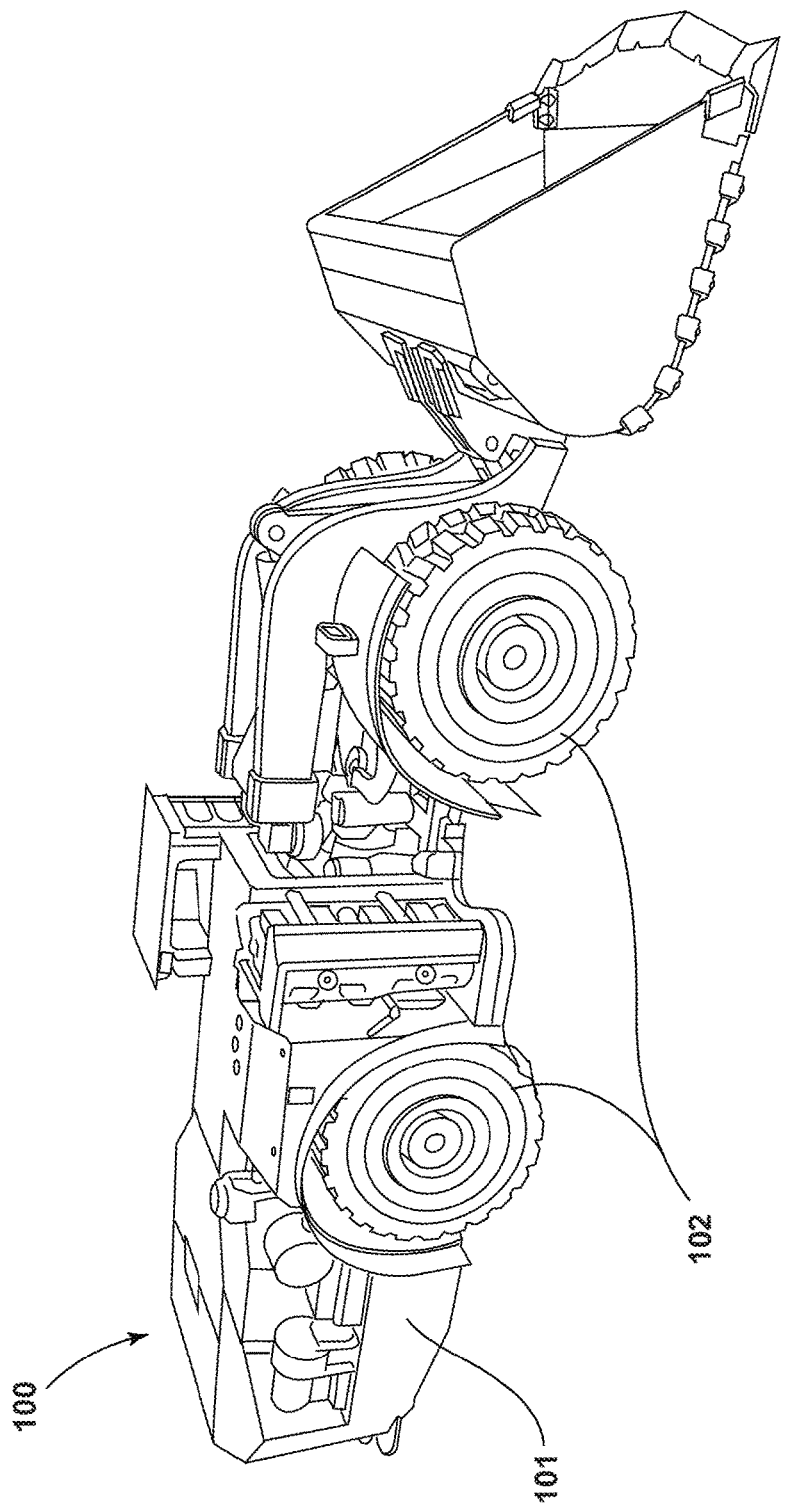
FIG. 10 is a perspective view of mining equipment, specifically, a front-end loader.

For example, FIG. 10 illustrates mining equipment 100 according to one embodiment of the invention. The mining equipment 100 may be an underground mining machine (for example, a continuous miner, a haulage system, a longwall shearer, a loader, and the like) or a surface mining machine (for example, a wheel loader, a hybrid shovel, a dragline miner, and the like). The mining equipment 100 may include a chassis 101 and a traction system 102, such as a plurality of wheels rotatably coupled to the chassis 105. The mining equipment 100 may also include other movable systems and components, such as a cable reel or a swing system. In the embodiment illustrated in FIG. 10, the mining equipment 100 is a load, haul, dump ("LHD") commonly used in underground mining environments.

Figure 11:
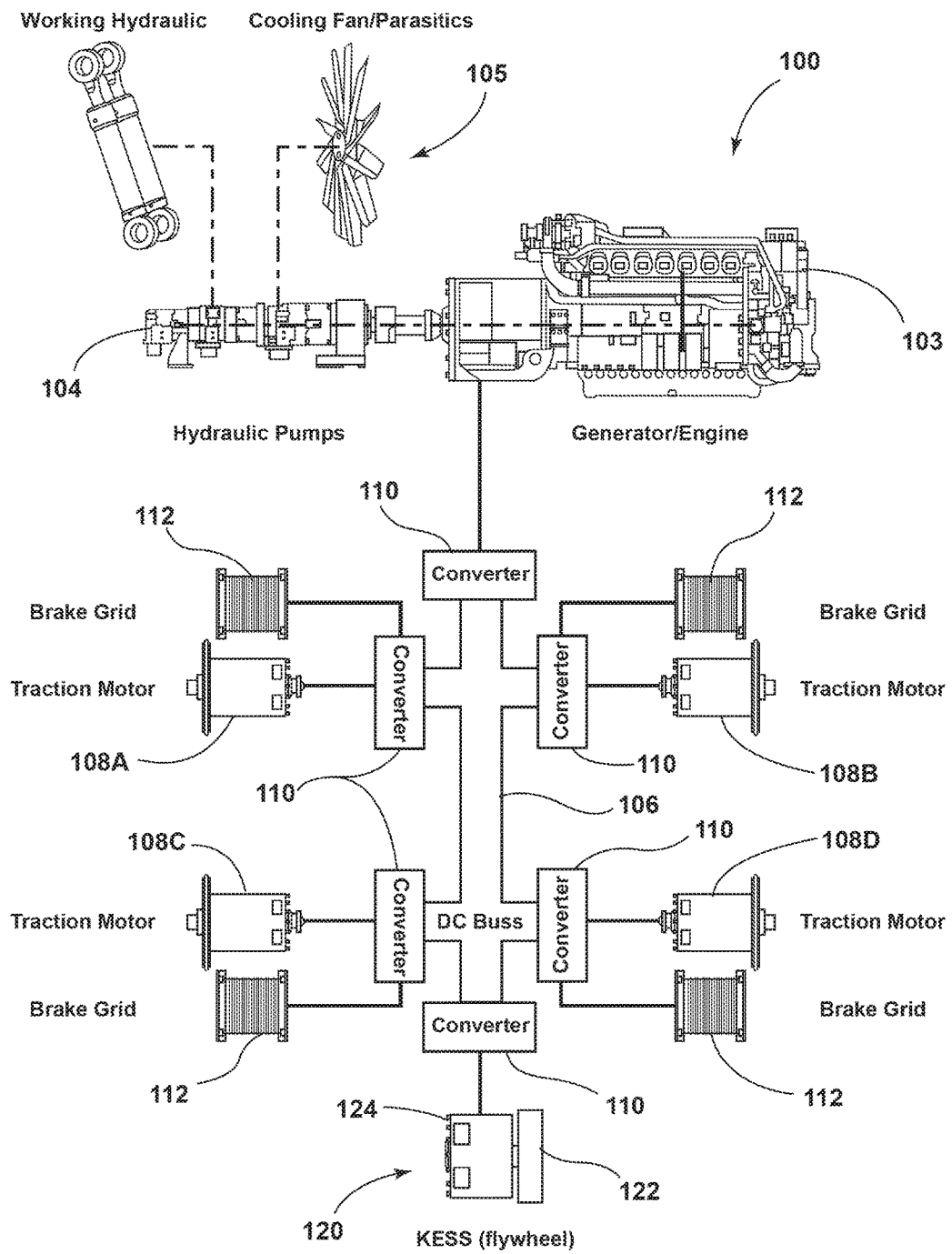
FIG. 11 schematically illustrates functional elements of the mining equipment of FIG. 10.

As illustrated in FIG. 11, the mining equipment 100 includes a generator/engine 103. The generator/engine 103 may include a diesel engine that outputs mechanical energy and a generator that converts mechanical energy output by the engine into electrical energy. In some embodiments, the generator includes a SR generator. In some embodiments, the generator may be used as a motor that increases the speed of the engine (for example, to use the engine as an energy storage device used separately or in combination with the kinetic energy storage system described below). It should be understood that in some embodiments, the mining equipment 100 includes one or more generators powered by one or more engines.

The generator/engine 103 provides mechanical power (shown in dashed lines in FIG. 11) to hydraulic pumps 104, which may drive working hydraulics and cooling fans and parasitics 107 using hydraulic energy (shown in dot-dashed lines in FIG. 11). In particular, rotational energy is passed through the generator and is provided to the hydraulic pumps 104 through a mechanical connection between the hydraulic pumps 104 and the generator/engine 103. The generator/engine 103 also provides electrical power (shown in solid lines in FIG. 11) to a bi-directional electrical bus 106 (for example, a capacitive direct current ("DC") bus). The bi-directional electrical bus 106 supplies electrical power to one or more traction motors 108 (for example, SR motors). For example, as illustrated in FIG. 11, the mining equipment 100 includes a front left traction motor 108A, a front right traction motor 108B, a rear left traction motor 108C, and a rear right traction motor 108D. Each traction motor 108 powers a wheel or other drive mechanism included in the traction system 102. In particular, each traction motor 108 converts electrical power received over the bi-directional electrical bus 106 into rotational energy for driving a drive mechanism. In some embodiments, one or more of the traction motors 108 include SR motors.

In some embodiments, the bi-directional electrical bus 106 is in communication with one or more converters 110. The converters 110 may be configured to transmit energy through the bi-directional electrical bus 106 or to receive power from the bi-directional electrical bus 106 (for example, to use the bi-directional electrical bus 106 as a bi-directional bus). Each converter 110 may be used as a DC-to-DC converter, a DC-to-AC inverter, an AC-to-DC rectifier, or another type of power converter. Alternatively or in addition, a converter 110 may be used as a motor controller for a traction motor 108. For example, the converter 110 may be configured to sense characteristics of a traction motor 108 and respond to the sensed characteristics. In some embodiments, one or more of the converters 110 use insulated-gate bipolar transistor ("IGBT") electrical switching devices. In some embodiments, a plurality of (for example, parallel) converters may be used for a component coupled to the bi-directional electrical bus 106. For example, the KESS 120 may be associated with one or more parallel converters that govern energy into the KESS 120 or out of the KESS 120. Also, in some embodiments, the KESS 120 may be associated with one or more parallel converters governing energy into the KESS 120 and parallel converters governing energy out of the KESS 120. The use of a plurality of parallel converters may impact the performance of the KESS 120 (for example, faster charging, faster discharging, increased charging potential, increased discharge potential, or a combination thereof).

As illustrated in FIG. 11, each traction motor 108 is associated with a braking grid 112. The braking grid 112 converts kinetic energy of the traction motor into thermal energy (heat) during braking of the mining equipment 100.

The mining equipment 100 also includes a kinetic energy storage system ("KESS") 120. The KESS 120 may include a flywheel 122 and a motor/generator 124. In some embodiments, the motor/generator 124 includes a variable speed motor, such as a variable speed SR motor/generator. For example, the act of storing and recovering energy from a KESS is associated with speeding up and slowing down the rotating mass. Accordingly, the wide constant speed and power range of an SR motor is well suited for the KESS. The flywheel 122 is mechanically coupled to the motor/generator 124. The motor/generator 124 is configured to receive electrical energy from the bi-directional electrical bus 106 and output rotational energy to the flywheel 122, and, alternatively, to receive rotational energy from the flywheel 122 and output electrical energy to the bi-directional electrical bus 106. Accordingly, upon receiving electrical energy, the motor/generator 124 rotates the flywheel 122 to store kinetic energy. Stored energy may be harvested from the KESS 120 by using rotational energy from the flywheel 122 to rotate a rotor included in the motor/generator 124, which converts the rotational energy into electrical energy that may be supplied to the bi-directional electrical bus 106. In some embodiments, the flywheel 122 included in the KESS 120 has a rotational speed from approximately 0 to approximately 6500 RPM, which allows the KESS 120 to provide energy output up to approximately 4000 horsepower ("hp") per second (approximately 3 MJ). In other embodiments, the flywheel 112 has a rotational speed from approximately 3000 RPM to approximately 10000 RPM or from approximately 5000 RPM to approximately 8000 RPM. Similarly, in some embodiments, the KESS 120 provides energy output from approximately 1 MJ to approximately 15 MJ or from approximately 2 MJ to approximately 7 MJ. As noted above, the energy output of the KESS 120 may depend on the configuration of the one or more converters coupling the KESS 120 to the bi-directional electrical bus 106.

Although not illustrated in FIG. 11, the mining equipment 100 also includes one or more controllers that manage operation of the generator/engine 103 and the KESS 120. In particular, the mining equipment 100 may include a controller that issues commands to the KESS 120, including commands relating to torque on the motor/generator 124 to store energy to or harvest energy from the KESS 120. Similarly, the equipment may include a controller that issues commands to the generator/engine 103 relating to output levels of the engine, the generator, or both. Furthermore, the mining equipment 100 may include a controller that issues commands to the traction motors 108 driving the traction system 102. It should be understood that this functionality may be performed by a single controller or a plurality of controllers. Also, in some embodiments, the functionality or a portion thereof may be performed by one or more controllers located remote from the mining equipment 100, such as in a remote control station for the mining equipment 100. In some embodiments, in some embodiments, functionality performed by the controller described here may be included in another component. For example, the controller may be included in the KESS 120 (for example, within a common housing).

In some embodiments, as described above with respect to FIG. 9, the mining equipment 100 may include a controller that issues commands to the KESS 120 and the generator/engine 103 to supply or harvest energy based on the speed of the mining equipment 100. In particular, as described in more detail below, the controller may issue commands to the KESS 120 and the generator/engine 103 to use the KESS 120 as a primary power source for the bi-directional electrical bus 106.

Figure 12:
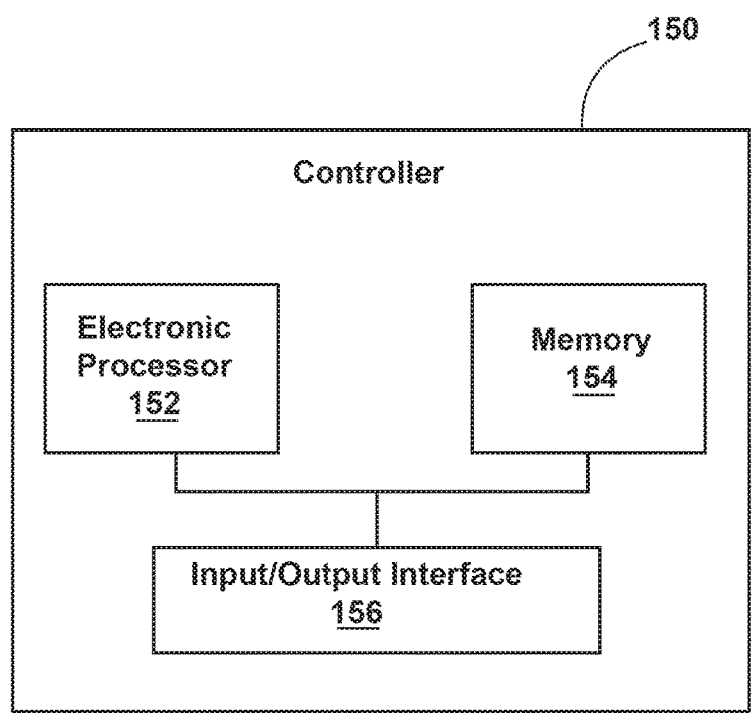
FIG. 12 schematically illustrates a controller included in the mining equipment of FIG. 10.

FIG. 12 illustrates one example of a controller 150 included in the mining equipment 100. As illustrated in FIG. 12, the controller 150 includes an electronic processor 152 (for example, one or more microprocessors, application specific integrated circuits ("ASICs"), or other electronic devices), a computer-readable, non-transitory memory 154, and an input/output interface 156. It should be understood that the controller 150 may include additional components than those illustrated in FIG. 12 and the configuration of components illustrated in FIG. 12 are provided as only one example. The memory 154 stores instructions executable by the electronic processor 152 to issue commands as noted above (for example, through the input/output interface 156). For example, the controller 150 may issue commands to control the power flows described below with respect to FIGS. 13-19. The controller 150 may also use the input/output interface 158 to receive information (for example, operating parameters, such as machine speed, steering direction, bus voltage, engine speed sensors, engine load, traction system load or command functions, hydraulic system load or command functions, and the like) that the controller 150 may use to determine when and what type of commands to issue. For example, in some embodiments, the controller 150 controls the KESS 120 based on one or more signals measured, received, or calculated for the mining equipment 100. It should be understood that the input/output interface 156 may communicate with components external to the controller 150 (for example, the KESS 120, the generator/engine 103, an engine controller, and the like) over a wired or wireless connection, including local area networks and controller area networks.

Figure 13:
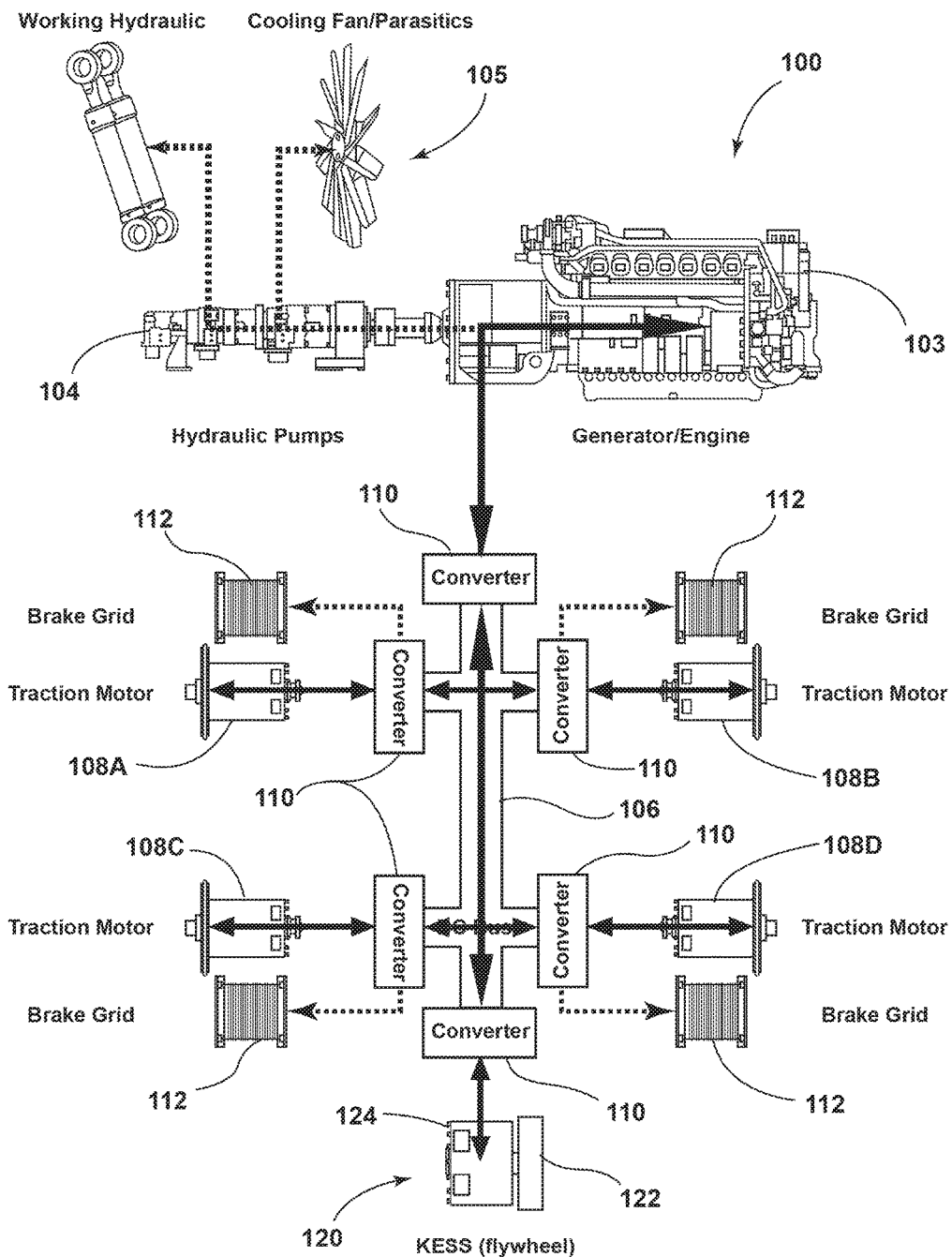
FIG. 13 schematically illustrates potential power flow within the equipment of FIG. 10.

FIG. 13 illustrates the potential power flows within the mining equipment 100. In particular, as illustrated in FIG. 13, the hydraulic pumps 104 consume energy provided by the generator/engine 103. However, the generator/engine 103 may also receive energy from the bi-directional electrical bus 106 (for example, during braking events). Furthermore, each traction motor 108 may receive energy from the bi-directional electrical bus 106 and supply energy to the bi-directional electrical bus 106. Similarly, the KESS 120 may receive energy from the bi-directional electrical bus 106 and supply energy to the bi-directional electrical bus 106. In contrast, the braking grids 112 only consume energy from the bi-directional electrical bus 106.

Figure 14:
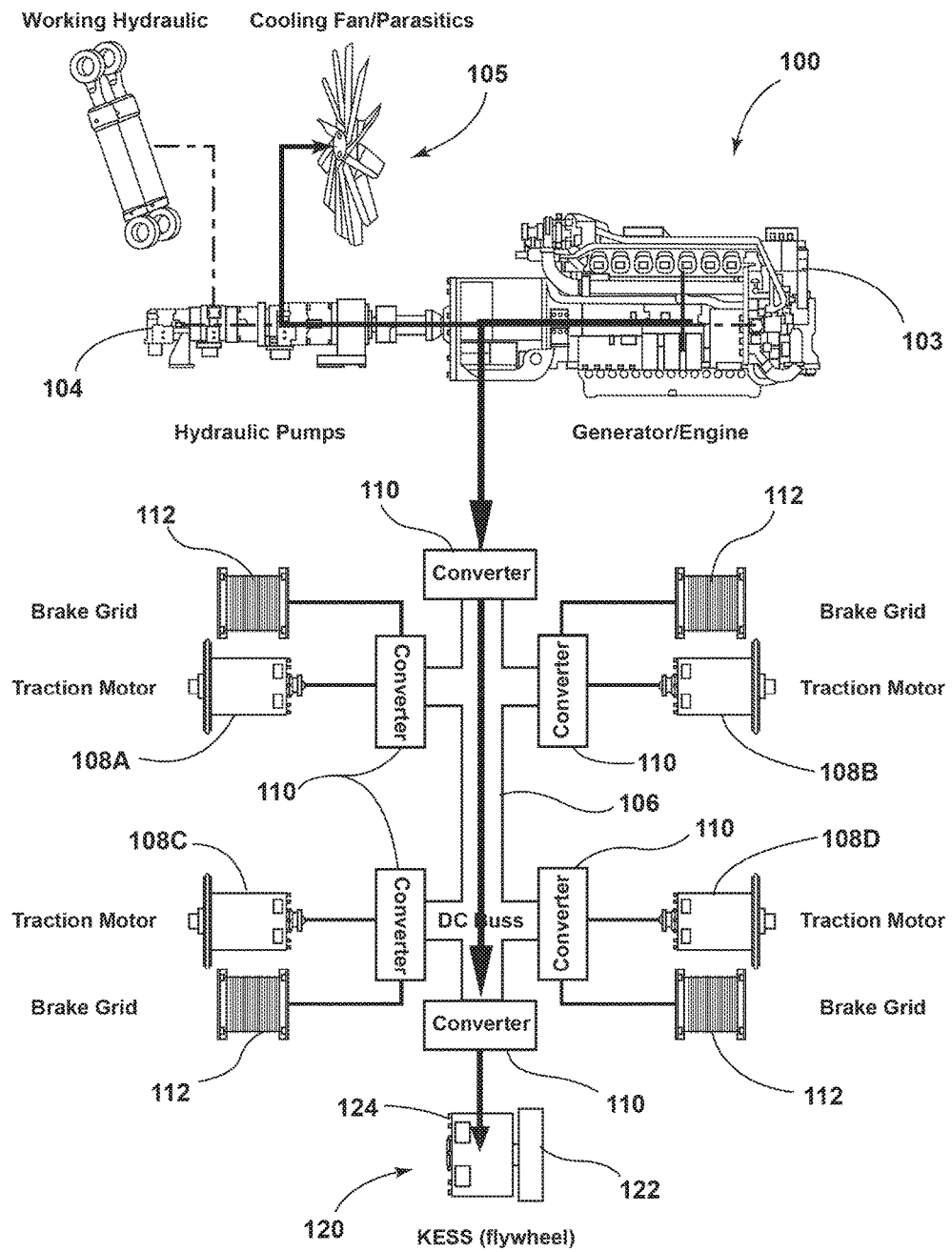
FIG. 14 schematically illustrates power flow within the equipment of FIG. 10 for charging the kinetic energy storage system.

FIG. 14 illustrates power flow within the mining equipment 100 for charging the KESS 120. In particular, as illustrated in FIG. 14, power supplied by the generator/engine 103 is provided to the bi-directional electrical bus 106, which supplies power for charging the KESS 120. In some embodiments, the KESS 120 is charged during start-up of the mining equipment 100. However, in other embodiments, the KESS 120 may be charged during times of low load on the generator/engine 103.

Figure 15:
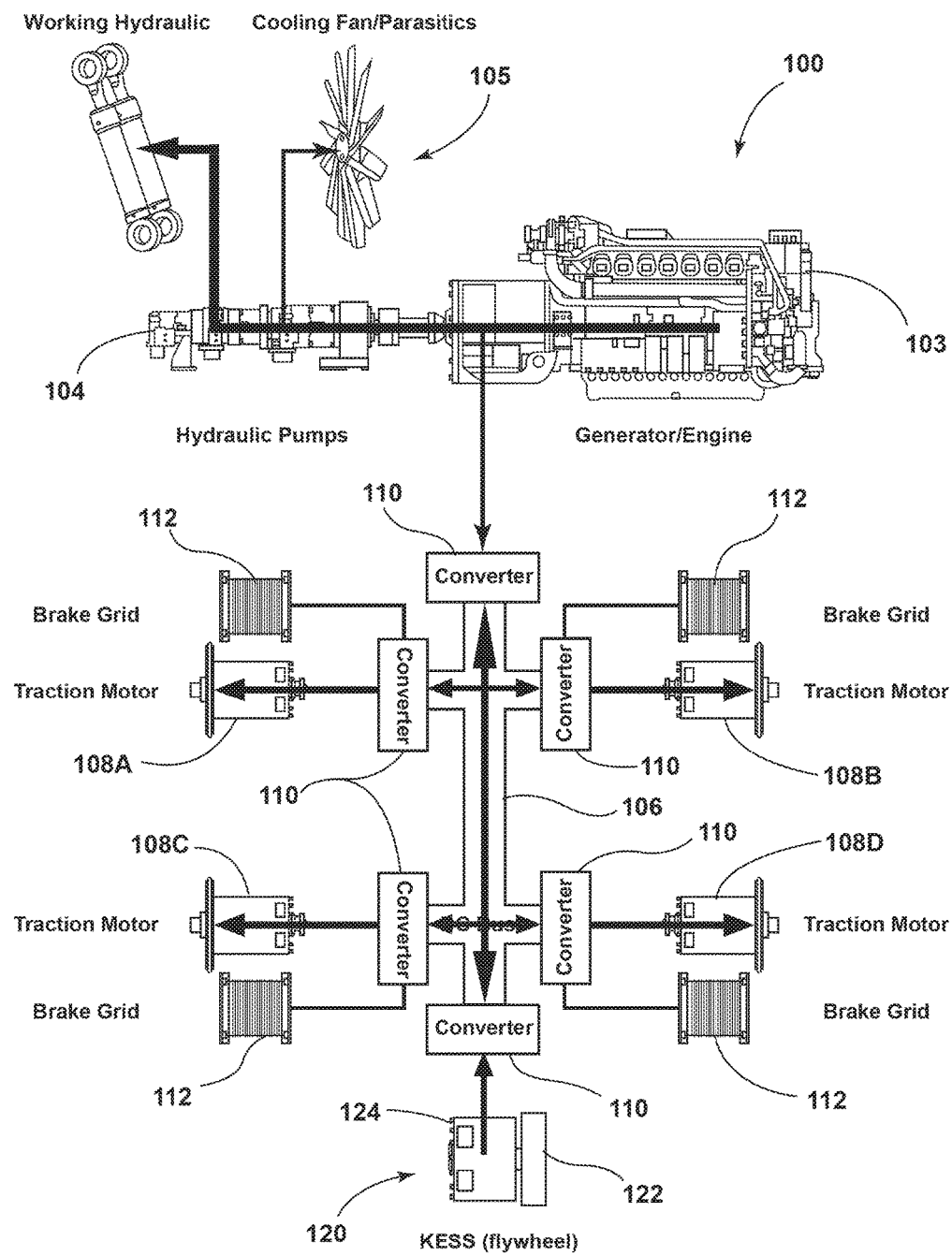
FIG. 15 schematically illustrates power flow in the equipment of FIG. 10 for performing propulsion using the kinetic energy storage system.

FIG. 15 illustrates power flow in the mining equipment 100 for performing propulsion using the KESS 120. In particular, after the KESS 120 is charged, the KESS 120 may supply power to the bi-directional electrical bus 106. The power is consumed by the traction motors 108. In some embodiments, the KESS 120 acts as the primary or master power source for the traction motors 108. If the KESS 120 cannot fully supply the traction motors 108 with needed power, the traction motors 108 may receive power from the generator/engine 103, which, as illustrated in FIG. 15, also supplies power to the bi-directional electrical bus 106. Accordingly, in this arrangement the KESS 120 is the primary provider of energy to the traction system 102 with the generator/engine 103 providing backup supply. The KESS 120 is a more responsive power source than the generator/engine 103. Accordingly, by using the more responsive power source first, the traction system 102 may increase speed faster than a conventional drive system would allow. Furthermore, using the KESS 120 as the primary provider of energy may reduce the need to operate the generator/engine 103 at full capacity. In particular, as described above, using the KESS 120 as the primary power source to the traction system 102 may allow the generator/engine 103 to operate at a steadier output, which saves fuel and lowers engine output requirements.

Accordingly, during operation of the mining equipment 100, the controller 150 may be configured to determine an energy demand on the bi-directional electrical bus 106 and determine energy available through the KESS 120. When the energy available through the KESS 120 satisfies the energy demand, the controller 150 may be configured to operate the KESS 120 as a primary power source for the bi-directional electrical bus 106 (e.g., controlling a rotational speed of the flywheel 122 included in the KESS 120). However, when the energy available through the KESS 120 cannot satisfy the energy demand, the controller 150 may operate the generator/engine 103 as a secondary power source (e.g., with any available energy from the KESS 120) for the bi-directional electrical bus 106 to satisfy the energy demand.

Figure 16:
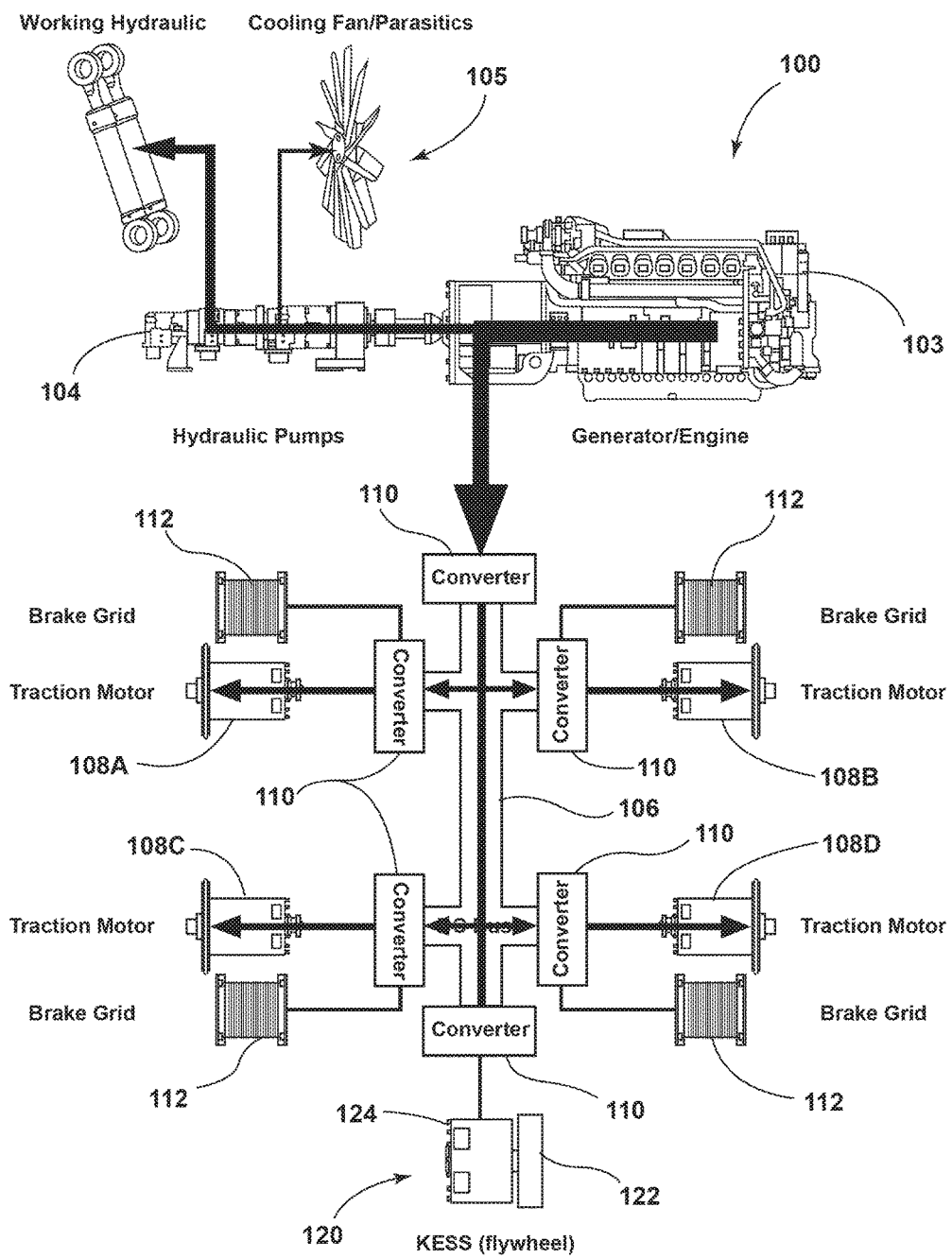
FIG. 16 schematically illustrates power flow in the equipment of FIG. 10 for performing propulsion without using the kinetic energy storage system.

FIG. 16 illustrates power flow in the mining equipment 100 for performing propulsion without using the KESS 120. In this situation, the traction motors 108 consume energy from the bi-directional electrical bus 106, which is supplied solely by the generator/engine 103. This situation may be used when the KESS 120 is not charged, is malfunctioning, or is not present.

Figure 17:
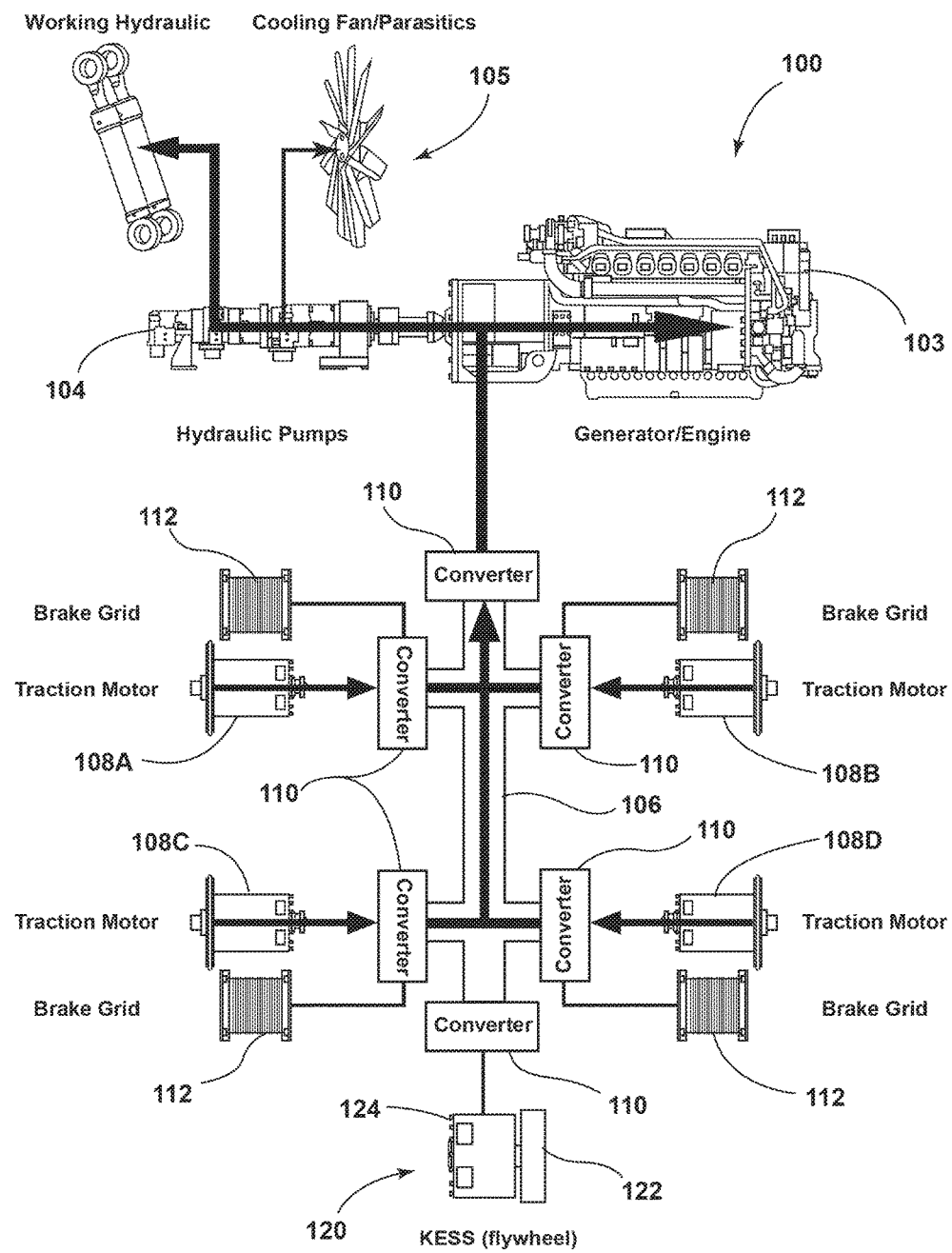
FIG. 17 schematically illustrates power flow in the equipment of FIG. 10 for performing light braking.

FIG. 17 illustrates power flow in the mining equipment 100 for performing light braking. As illustrated in FIG. 17, during braking of the traction system 102, the traction motors 108 act as generators and supply electrical energy to the bi-directional electrical bus 106. In the situation illustrated in FIG. 17 (light braking), the energy supplied by the traction motors 108 may be supplied to the generator included in the generator/engine 103. The generator may use the received energy to speed up the drive line between the generator/engine 103 and the hydraulic pumps 104 (for example, speed up the engine to a set speed point where fuel injectors are commanded to cease delivering fuel to the engine). In some situations, when the drive line is being motivated by the generator included in the generator/engine 103, the generator/engine 103 reduces fuel consumption (for example, to operate at a zero fuel level).

Figure 18:
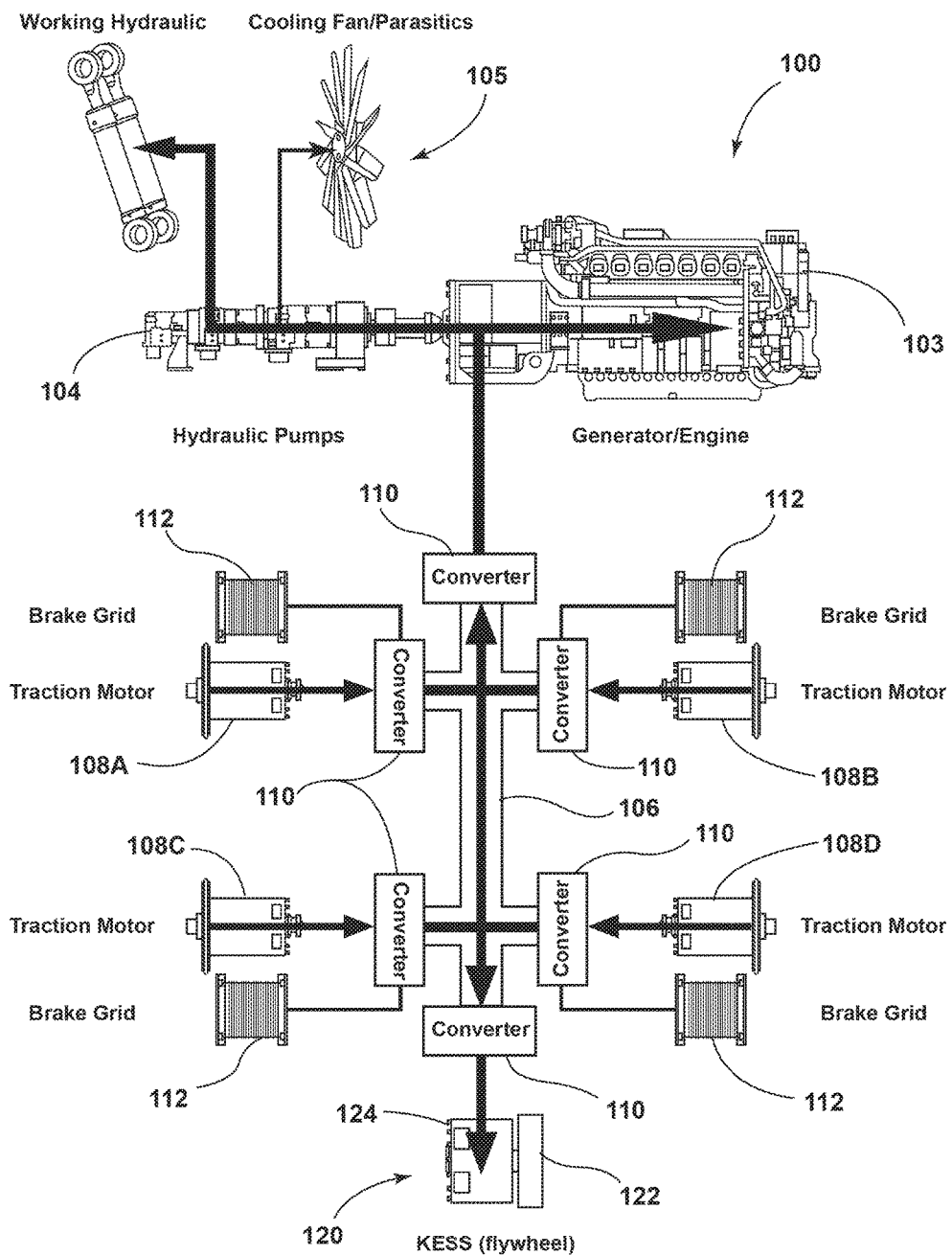
FIG. 18 schematically illustrates power flow in the equipment of FIG. 10 for performing heavy braking and charging the kinetic energy storage system.

Similarly, FIG. 18 illustrates power flow in the mining equipment 100 for performing heavy braking and charging the KESS 120. As illustrated in FIG. 18, in these situations, the traction motors 108 act as generators and supply electrical power to the bi-directional electrical bus 106. In the situation illustrated in FIG. 18 (heavy braking), the energy generator by the traction motors 108 and supplied to the bi-directional electrical bus 106 may be supplied to the generator included in the generator/engine 103 and to the KESS 120.

Figure 19:
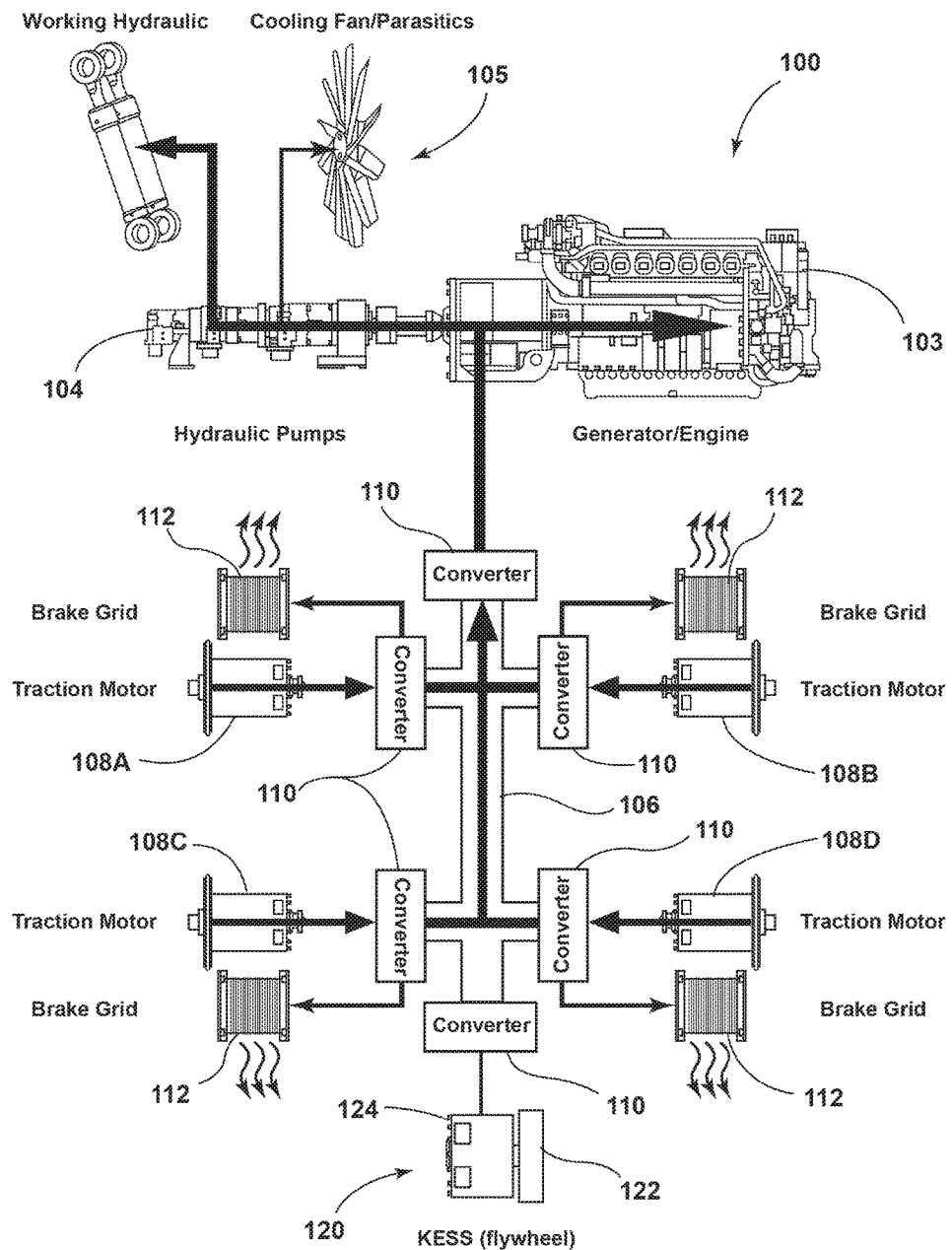
FIG. 19 schematically illustrates power flow in the equipment of FIG. 10 for performing heavy breaking without charging the kinetic energy storage system.

FIG. 19 illustrates power flow in the mining equipment 100 for performing heavy breaking without charging the KESS 120 (for example, the KESS 120 is full, malfunctioning, or not represent). As illustrated in FIG. 19, in these situations, the traction motors 108 act has generators and supply electrical power to the bi-directional electrical bus 106. Some of the supplied power is provided to the generator included in the generator/engine 103. However, some of the supplied power is also supplied to one or more of the braking grids 112, which convert the energy into heat.

It should be understood that other modes of operation may be used with the KESS 120. For example, in some embodiments, the generator/engine 103 may be used as the primary power source of the traction system 102 and the KESS 120 may provide backup power supply. In this configuration, a controller may be configured to issue commands to the KESS 120 that may be based on the operating speed of the traction system 102.

Also, in some embodiments, a user interface is provided for the mining equipment 100 that allows an operator to configure the KESS 120. In some embodiments, the user interface may also display (for example, textually or graphically) the current amount of energy stored in the KESS 120.

Figure 20:
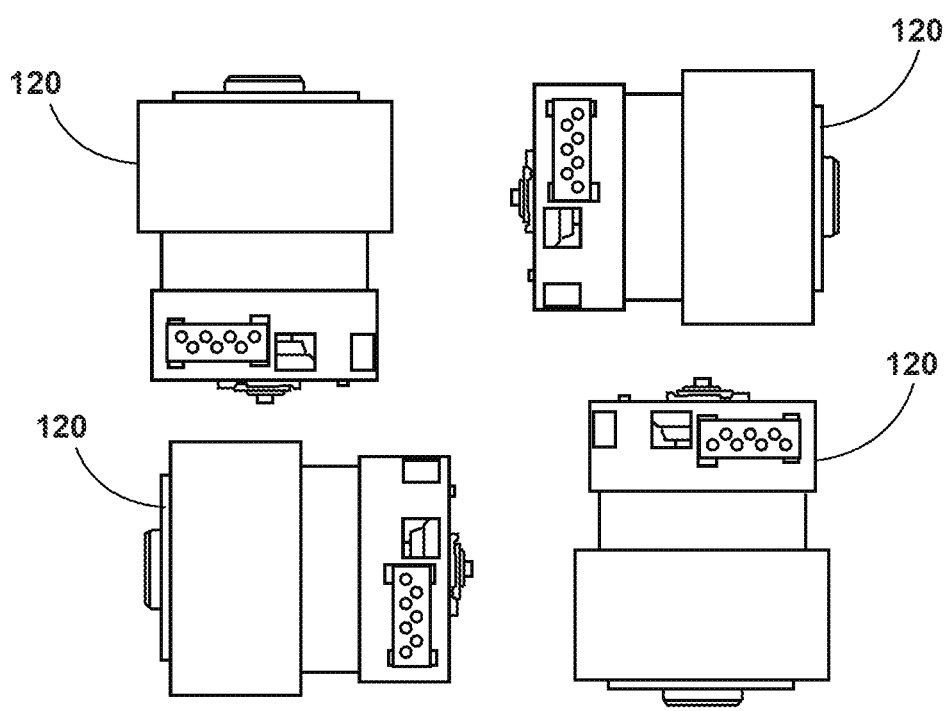
FIG. 20 schematically illustrates a mining machine including multiple kinetic energy storage systems.

It should also be understood that more than one KESS 120 may be used for a particular mining machine depending on the energy needs of the machine and the characteristics of the KESS 120. Also, in some embodiments, multiple KESSs 120 may be used to reduce gyroscopic effects associated with a KESS (the rotation of the flywheel). For example, two separate KESSs 120 (a first KESS 120 and a second KESS 120) may be contained within a single housing with the flywheels 122 counter-rotating reduce the gyroscopic effects on the machine. For example, a first KESS 120 may include a first flywheel 122 that rotates in a first direction, and a second KESS 120 may include a second flywheel 122 that rotates in a second direction opposite the first direction. Similarly, four KESSs 120 (a first KESS 120, a second KESS 120, a third KESS 120, and a fourth KESS 120) may be positioned at four cardinal directions along a plane to reduce gyroscopic effects. For example, as illustrated in FIG. 20, the first KESS 120 may be is positioned at a first cardinal direction along a plane, the second KESS 120 may be positioned at a second cardinal direction along the plane, the third KESS 120 may be positioned at a third cardinal direction along the plane, and the fourth KESS 120 may be positioned at a fourth cardinal direction along a plane.

As noted above, the mining equipment 100 may include a haulage vehicle, such as an LHD commonly used in underground mining environments. As illustrated in FIG. 20, an LHD 200 includes a bucket 202 supported by one or more arms 204, wherein the bucket 202 is movable in at least one direction (for example, a horizontal height, an angle from a horizontal position, or the combination thereof). The bucket 202 may be moved using one or more actuators (changing the position of the bucket 202, the arms 204, or both), such as one or more hydraulic actuators, rams, and the like, included in the LHD 200. The bucket 202 may be moved based on input received from an operator control, such as a joystick, lever, button, touch screen, and the like included in the LHD 200. A controller, such as the controller 150 described above or a separate, similar controller, included in the LHD 200 may receive the input and control the one or more actuators according (for example, by issuing commands to the one or more actuators). In some embodiments, the controller is also configured to provide an automatic return-to-dig functionality.

Figure 21:
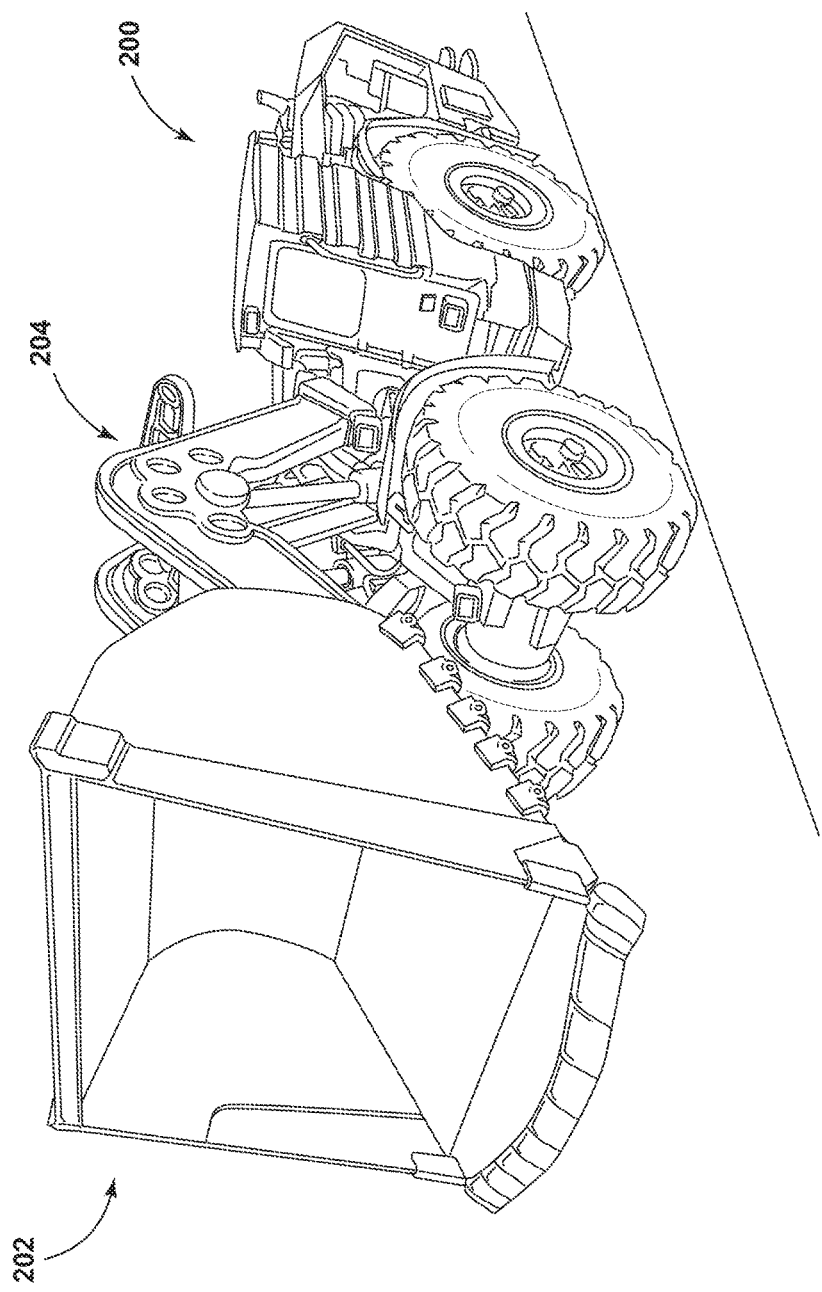
FIG. 21 illustrates a load haul dump ("LHD") with a bucket positioned in a dump position.
Figure 22:
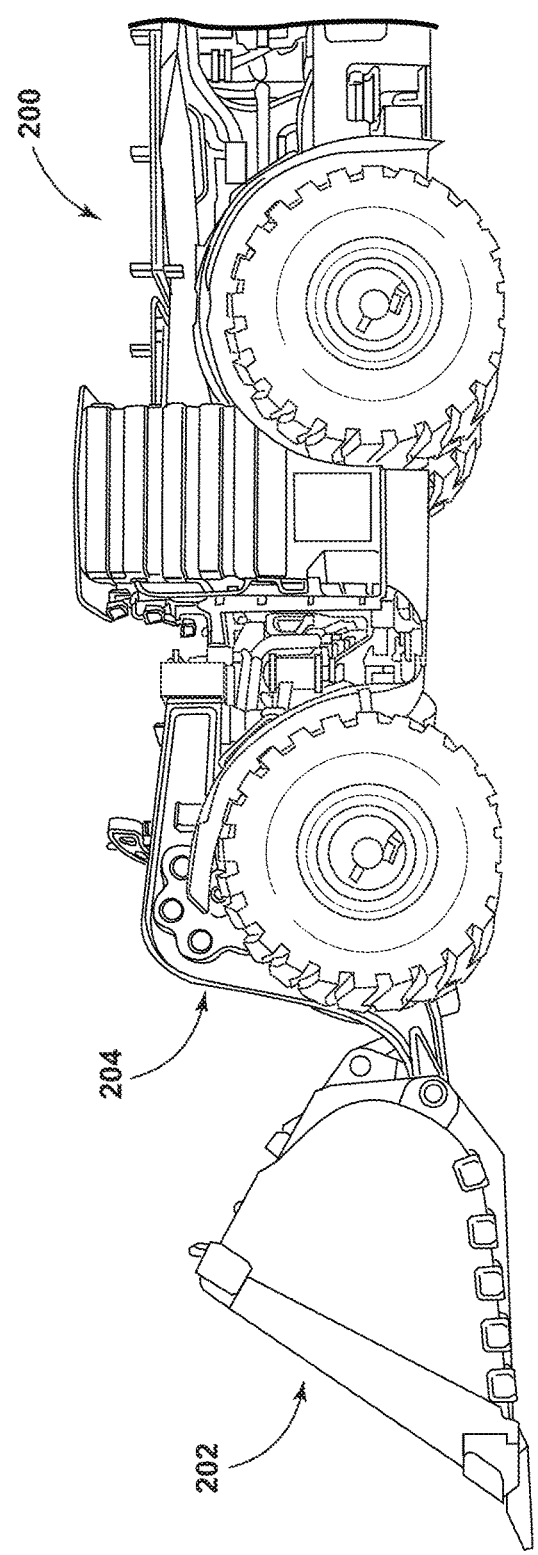
FIG. 22 illustrates the LHD of FIG. 20 with the bucket positioned in a dig position.

For example, when the bucket 202 of the LHD 200 is in a non-dig position (for example, a dump position as illustrated in FIG. 21), an operator operating the LHD 200 may press a selection mechanism (for example, "return to dig" selection mechanism), such as a button, positioned on an operator control included in the LHD 200 (for example, a right or left hand joystick of the LHD 200, a touchscreen, and the like) or at a remote control station of the LHD 200. When the operator selects this selection mechanism, the controller 150 receives a signal from the selection mechanism (for example, directly or over one or more networks) and, in response, automatically controls the one or more actuators associated with the bucket 202 to reposition the bucket 202 to a predetermined dig position (for example, a predetermined height, a predetermined angle, or the combination thereof) (see, for example, FIG. 22). As illustrated in FIG. 22, the return-to-dig position may be defined as the bucket 202 being approximately horizontal with the ground or the material being dug.

For example, the controller 150 may access the predetermined dig position from a memory (such as the memory 154 included in the controller 150) and compare the stored predetermined dig position to a current position of the bucket 202. As described below, the controller 150 may use data collected by one or more sensors to determine the current positon of the bucket 202. When the positions differ, the controller 150 may control the one or more actuators to change the current position of the bucket 202 to match the stored predetermined dig position. For example, when the current height of the bucket 202 is greater than the height included in the predetermined dig position, the controller 150 may control the one or more actuators to lower the bucket 202. Similarly, when the current angle of the bucket 202 is greater than the angle included in the predetermined dig position, the controller 150 may control the one or more actuators to decrease the angle of the bucket 202.

In some embodiments, the controller 150 may repeatedly compare a current position of the bucket 202 to the stored predetermined dig position while moving the bucket 202 until the positions align. Alternatively or in addition, the controller 150 may initially compare a current position of the bucket 202 to the stored predetermined dig position and determine an amount of movement necessary to bring the bucket 202 in align with the stored predetermined dig position. The controller 150 may then command movement of the bucket 202 based on the determined distance. Accordingly, in either configuration, the controller 150 translates a difference between the current position and the stored position into one or a series of commands to the one or more actuators simulating commands received from an operator control. Accordingly, using the selection mechanism allows the operator to concentrate on driving the LHD 200 without having to also perform multiple joystick movements to return the bucket 202 to a dig position.

In some embodiments, an operator may manually adjust the predetermined dig position (for example, the predetermined height, the predetermined angle, or the combination thereof) to suit the operator's preferences or the operating environment. For example, the operator may be able to signal when the bucket 202 is in a desired dig position (for example, by selecting a selection mechanism or operating an operator control). The controller 150 receives the operator input and saves the current position of the bucket 202 (for example, the current height, the current angle, or the combination thereof). The controller 150 may determine the current position based on data collected by one or more sensors communicating with the controller 150 (for example, a pressure sensor, an encoder, an inclinometer, and the like). The stored positional information may be recalled and applied when the operator subsequently selects the "return to dig" selection mechanism. In some embodiments, the modified predetermined dig position may be stored as an absolute position (for example, a height and an angle). However, alternatively or in addition, the modified predetermined dig position may be stored as an offset to the default predetermined dig position (for example, a height offset and an angle offset). In some embodiments, the modified dig position may be reset to the default predetermined dig position after the LHD 200 is shut down and restarted. In other embodiments, the modified dig position may be rest to the default predetermined dig position manually (for example, in response to selection of a "reset to default" selection mechanism).

Alternatively or in addition, the controller 150 included in the LHD 200 may provide automatic return-to-carry functionality. For example, when the bucket 202 of the LHD 200 is in a non-dig position (for example, a dump position as illustrated in FIG. 21), an operator operating the LHD 200 may press a selection mechanism (for example, "return to carry" selection mechanism), such as a button, positioned on an operator control included in the LHD 200 (for example, a right or left hand joystick of the LHD 200, a touchscreen, and the like) or a remote control station for the LHD 200. When the operator selects this selection mechanism, the controller 150 receives a signal from the selection mechanism (for example, directly or over one or more networks) and, in response, automatically controls the one or more actuators associated with the bucket 202 to reposition the bucket 202 to a predetermined carry position (for example, a predetermined height, a predetermined angle, or the combination thereof) (see, for example, FIG. 23).

For example, the controller 150 may access the predetermined carry position from a memory (such as the memory 154 included in the controller 150) and compare the stored predetermined carry position to a current position of the bucket 202. As described above, the controller 150 may use data collected by one or more sensors to determine the current positon of the bucket 202. When the positions differ, the controller 150 may control the one or more actuators to change the current position of the bucket 202 to match the stored predetermined carry position. For example, when the current height of the bucket 202 is less than the height included in the predetermined carry position, the controller 150 may control the one or more actuators to raise the bucket 202. Similarly, when the current angle of the bucket 202 is less than the angle included in the predetermined carry position, the controller 150 may control the one or more actuators to increase the angle of the bucket 202.

In some embodiments, the controller 150 may repeatedly compare a current position of the bucket 202 to the stored predetermined carry position while moving the bucket 202 until the positions align. Alternatively or in addition, the controller 150 may initially compare a current position of the bucket 202 to the stored predetermined carry position and determine an amount of movement necessary to bring the bucket 202 in align with the stored predetermined carry position. The controller 150 may then command movement of the bucket 202 based on the determined distance. Accordingly, in either configuration, the controller 150 translates a difference between the current position and the stored position into one or a series of commands to the one or more actuators simulating commands received from an operator control. Accordingly, using the selection mechanism allows the operator to concentrate on driving the LHD 200 without having to also perform multiple joystick movements to return the bucket 202 to a carry position.

In some embodiments, an operator may manually adjust the predetermined carry position (for example, the predetermined height, the predetermined angle, or the combination thereof) to suit the operator's preferences or the operating environment. For example, the operator may be able to signal when the bucket 202 is in a desired carry position (for example, by selecting a selection mechanism or operating an operator control). The controller 150 receives the operator input and saves the current position of the bucket 202 (for example, the current height, the current angle, or the combination thereof). The controller 150 may determine the current position based on data collected by one or more sensors communicating with the controller 150 (for example, a pressure sensor, an encoder, an inclinometer, and the like). The stored positional information may be recalled and applied when the operator subsequently selects the "return to carry" selection mechanism. In some embodiments, the modified predetermined carry position may be stored as an absolute position (for example, a height and an angle). However, alternatively or in addition, the modified predetermined carry position may be stored as an offset to the default predetermined carry position (for example, a height offset and an angle offset). In some embodiments, the modified carry position may be reset to the default predetermined carry position after the LHD 200 is shut down and restarted. In other embodiments, the modified carry position may be rest to the default predetermined carry position manually (for example, in response to selection of a "reset to default" selection mechanism).

Figure 23:
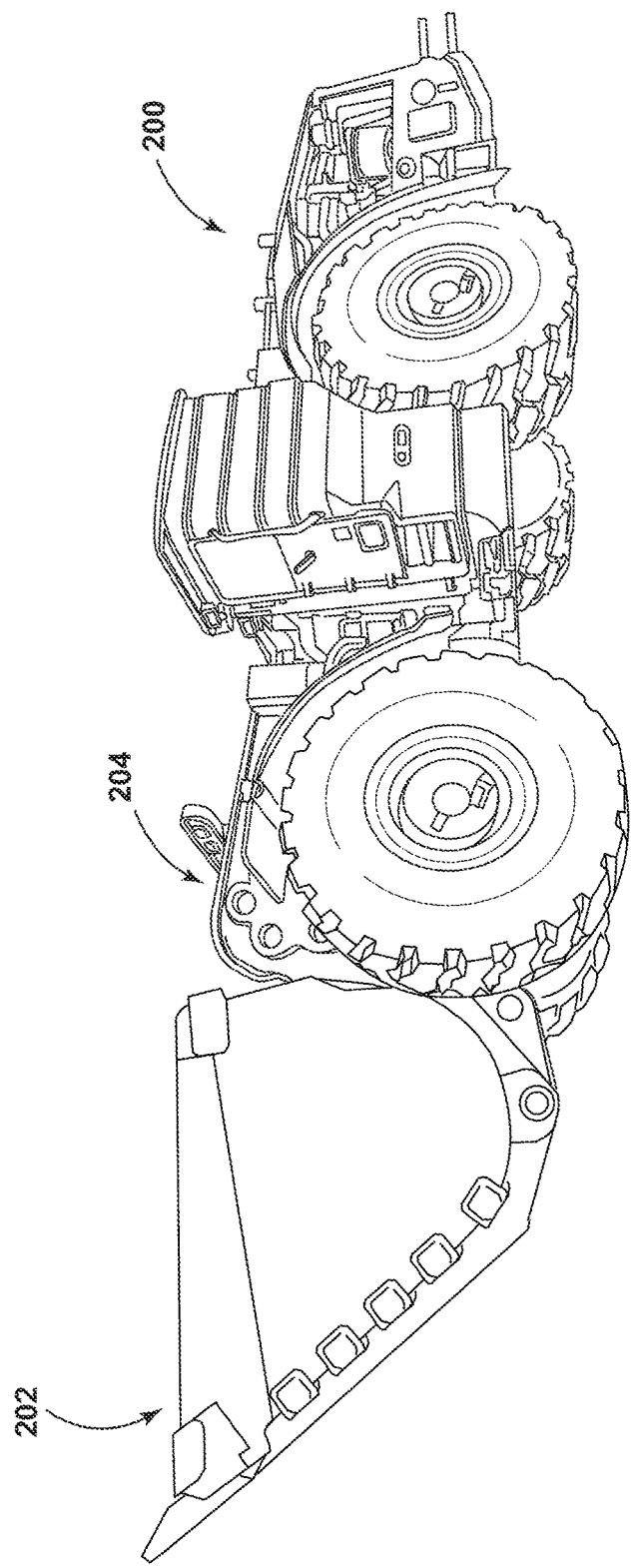
FIG. 23 illustrates the LHD of FIG. 20 with the bucket positioned in a carry position.

As illustrated in FIG. 23, the carry position may be defined as the bucket 202 being rolled back and the arms 204 being low (the bucket 202 is low and tucked in to place the bucket 202 in a very stable position so that the machine may be driven over long distances commonly performed using LHDs). In particular, the carry position and, subsequently, the automatic return-to-carry functionality may provide benefits in situations where, once the operator fills the bucket 202 or dumps the bucket 202, the operator has to drive the LHD 200 over a great distance (for example, greater than approximately 500 feet). For example, surface wheel loaders typically travel less than 300 feet during a round trip between a haul truck and a dig face. This distance generally does not warrant placing the bucket into a carry position. Rather, while traveling this distance, the surface loader arms may be used to fully raise the bucket or drop the bucket back into a dig position. In contrast, LHD return distances are typically 1000 feet or greater. Accordingly, the automatic return-to-carry functionality provides benefits for LHDs driven a long distance where it not desirable (for example, for stability purposes) to drive with the bucket 202 fully raised.

Thus, embodiments of the invention provide, among other things, a kinetic energy storage system for a mining machine. The kinetic energy storage system may be used to power a traction system of the mining machine using energy stored during engine start-up, low engine load, and braking events.

Various features and advantages of the invention are set forth in the following claims.

What is claimed is:

1. A haulage vehicle comprising:
   a bi-directional electrical bus;
   a power source coupled to the bi-directional electrical bus through a first power converter;
   a motor coupled to the bi-directional electrical bus through a second power converter, the motor powered by energy available on the bi-directional electrical bus and operating a drive mechanism included in the haulage vehicle;
   a kinetic energy storage system including a flywheel and a switched reluctance motor, the kinetic energy storage system coupled to the bi-directional electrical bus through a third power converter; and
   a controller configured to communicate with the kinetic energy storage system and the power source,
   wherein the controller is configured to operate the kinetic energy storage system as a primary power source for the bi-directional electrical bus and to operate the power source as a secondary power source for the bi-directional electrical bus when the kinetic energy storage system cannot satisfy an energy demand on the bi-directional electrical bus.

2. The haulage vehicle of claim 1, wherein the power source includes an engine and a switched reluctance motor/generator.

3. The haulage vehicle of claim 2, wherein the switched reluctance motor/generator increases a speed of a drive line associated with the engine during braking of the drive mechanism.

4. The haulage vehicle of claim 1, wherein the power source includes a trail cable.

5. The haulage vehicle of claim 1, wherein the power source includes a battery.

6. The haulage vehicle of claim 1, wherein the power source includes a fuel cell.

7. The haulage vehicle of claim 1, wherein the motor includes a second switched reluctance motor.

8. The haulage vehicle of claim 1, wherein the controller is further configured to operate the kinetic energy storage system to store energy during braking of the drive mechanism.

9. The haulage vehicle of claim 1, wherein the switched reluctance motor is a variable speed motor.

10. The haulage vehicle of claim 1, wherein the flywheel operates from approximately 0 revolutions per minute to approximately 6500 revolutions per minute.

11. The haulage vehicle of claim 1, wherein the kinetic energy storage system outputs energy up to approximately 4000 horsepower per second.

12. The haulage vehicle of claim 1, wherein a rotational speed of the flywheel decreases as a speed of the drive mechanism increases and the rotational speed of the flywheel increases as the speed of the drive mechanism decreases.

13. The haulage vehicle of claim 1, further comprising a second kinetic energy storage system included in a common housing with the first kinetic energy storage system, wherein the second kinetic energy storage system includes a second flywheel.

14. The haulage vehicle of claim 13, wherein the first flywheel rotates in a first direction and wherein the second flywheel rotates in a second direction opposite the first direction.

15. The haulage vehicle of claim 1, further comprising a second kinetic energy storage system, a third kinetic energy storage system, and a fourth kinetic energy storage system, wherein the first kinetic energy storage system is positioned at a first cardinal direction along a plane, the second kinetic energy storage system is positioned at a second cardinal direction along the plane, the third kinetic energy storage system is positioned at a third cardinal direction along the plane, and the fourth kinetic energy storage system is positioned at a fourth cardinal direction along the plane.

16. The haulage vehicle of claim 1, wherein the third power converter includes a plurality of parallel power converters supplying energy to the kinetic energy storage system from the bi-directional electrical bus.

17. The haulage vehicle of claim 1, wherein the third power converter includes a plurality of parallel power converters supplying energy to the bi-directional electrical bus from the kinetic energy storage system.

18. The haulage vehicle of claim 1, wherein the controller communicates with the power source through an engine controller.

19. A method of operating a haulage vehicle, the method comprising:
- determining, with a controller configured to communicate with a kinetic energy storage system and a power source included in the haulage vehicle, an energy demand on a bi-directional electrical bus included in the haulage vehicle;
- determining, with the controller, energy available through the kinetic energy storage system;
- when the energy available through the kinetic energy storage system satisfies the energy demand, operating, with the controller, the kinetic energy storage system as a primary power source for the bi-directional electrical bus; and
- when the energy available through the kinetic energy storage system cannot satisfy the energy demand, operating, with the controller, the power source as a secondary power source for the bi-directional electrical bus.

20. The method of claim 19, wherein operating the kinetic energy storage system includes controlling a rotational speed of a flywheel coupled to a switched reluctance motor.

* * * * *

UNITED STATES PATENT AND TRADEMARK OFFICE
CERTIFICATE OF CORRECTION

PATENT NO. : 9,873,318 B2  
APPLICATION NO. : 15/167608  
DATED : January 23, 2018  
INVENTOR(S) : William A. Dorsett et al.

Page 1 of 1

It is certified that error appears in the above-identified patent and that said Letters Patent is hereby corrected as shown below:

On the Title Page

Item (73) "ASSIGNEE," replace "Joy Global Longview Operation LLC" with --Joy Global Longview Operations LLC--

Signed and Sealed this  
Twelfth Day of March, 2019

Andrei Iancu  
*Director of the United States Patent and Trademark Office*